United States Patent [19]

Masegi et al.

[11] Patent Number: 5,369,574
[45] Date of Patent: Nov. 29, 1994

[54] SENTENCE GENERATING SYSTEM

[75] Inventors: Koichi Masegi, Machida; Minoru Fujita, Yokohama; Shogo Shibata, Tokyo, all of Japan

[73] Assignee: Canon Kabushiki Kaisha, Tokyo, Japan

[21] Appl. No.: 738,118

[22] Filed: Jul. 30, 1991

[30] Foreign Application Priority Data

Aug. 1, 1990 [JP] Japan .................................. 2-205842
Jul. 2, 1991 [JP] Japan .................................. 3-161517
Jul. 5, 1991 [JP] Japan .................................. 3-165732

[51] Int. Cl.$^5$ .............................................. G06F 15/38
[52] U.S. Cl. ........................... 364/419.08; 364/419.04
[58] Field of Search .............. 364/419, 419.01, 419.02, 364/419.04, 419.05, 419.08

[56] References Cited

U.S. PATENT DOCUMENTS 5,101,349  3/1992  Tokuume et al. .................... 364/419

FOREIGN PATENT DOCUMENTS 0201096 11/1986 European Pat. Off. .
0201324 11/1986 European Pat. Off. .
0230340  7/1987 European Pat. Off. .
0387876  9/1990 European Pat. Off. .

OTHER PUBLICATIONS

Future Generations Computer Systems, "Science and Technology Agency's Mu Machine Translation Project", vol. 2, No. 2, Jun. 1986, Nagao, et al. pp. 125–139.

Primary Examiner—Roy N. Envall, Jr.
Assistant Examiner—Xuong Chung-Trans
Attorney, Agent, or Firm—Fitzpatrick, Cella, Harper & Scinto

[57] ABSTRACT

A system and method for generating a sentence from an inputted semantic representation includes a memory for storing a limitation which a generated sentence should satisfy generator, a generating sentence from the inputted semantic representation based upon the stored limitation, an evaluator for evaluation the generated results, and an altering device for altering the stored limitation based upon the evaluation. A cycle composed of sentence generation, evaluation of the generated sentence and alteration of the limitation is repeated until the evaluation satisfies a predetermined criterion.

21 Claims, 19 Drawing Sheets

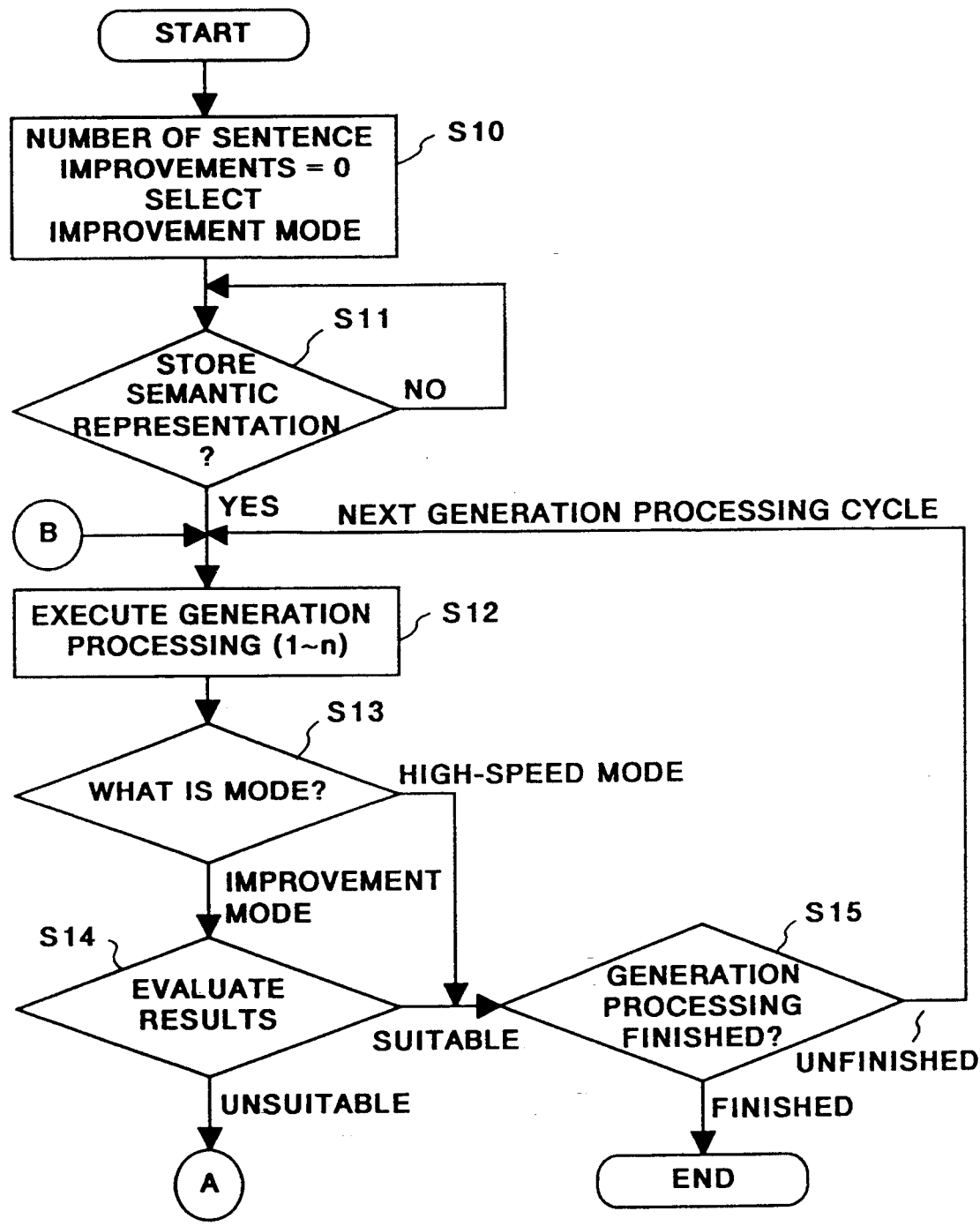
F I G. 8A

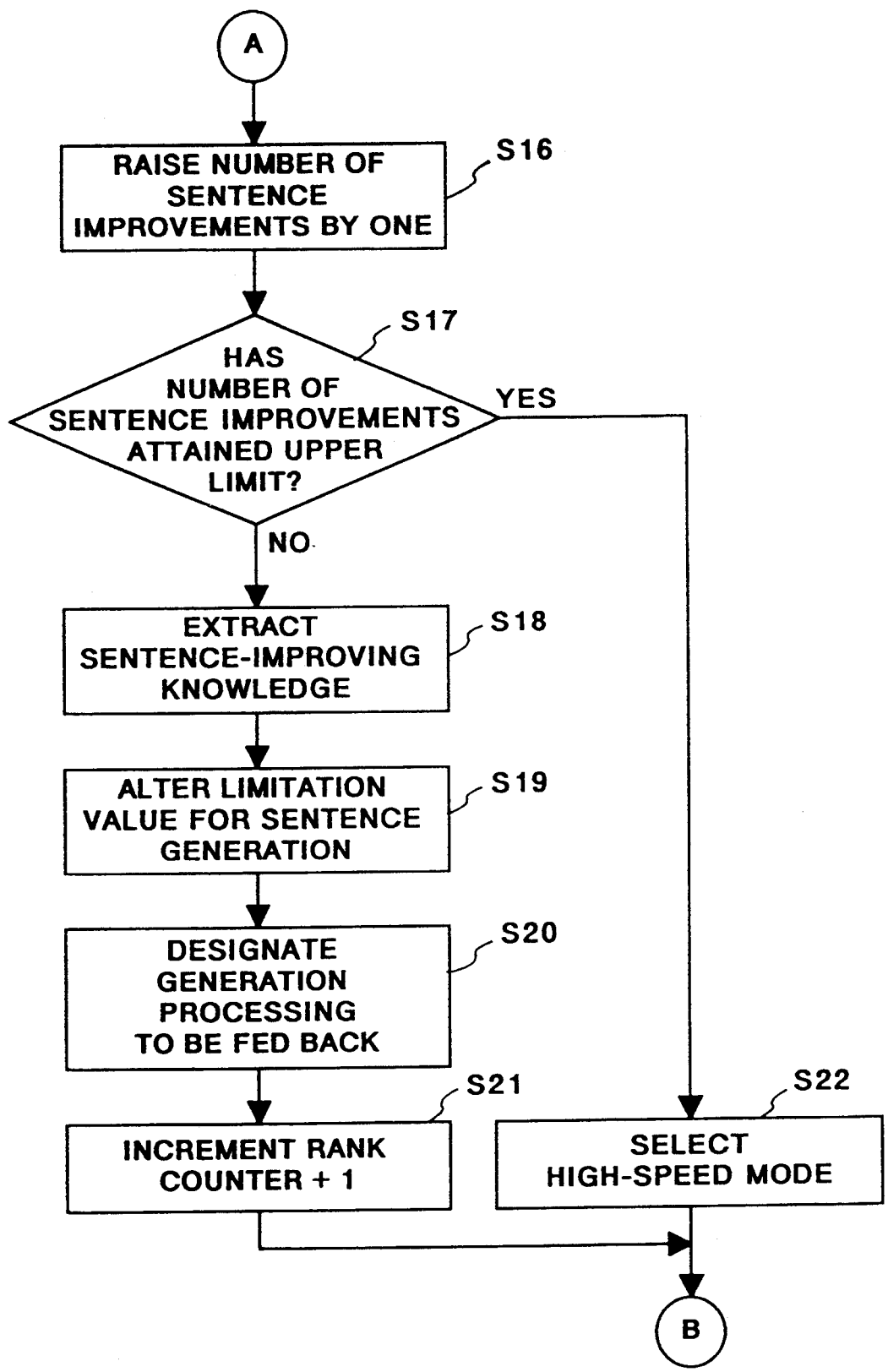
F I G. 8B

EXECUTION EXAMPLE 1: MAXIMUM NUMBER
OF CHARACTERS = 46 a

| INTERMEDIATE RESULT OF GENERATION PROCESSING (CONVERSION TO CHARACTER STRING) |
|---|
| "Because snow had been falling since morning and the transit system was in disarray, Hanako, who had slept until late morning, arrived at the office late." |

▼

RESULT OF EVALUATION: SENTENCE IS OF APPROPRIATE LENGTH [{46 CHARACTERS (UPPER LIMIT OF EVALUATION CRITERION)} > {43 CHARACTERS (INTERMEDIATE RESULT)}]  — b

▼

O.K.

F I G. 13

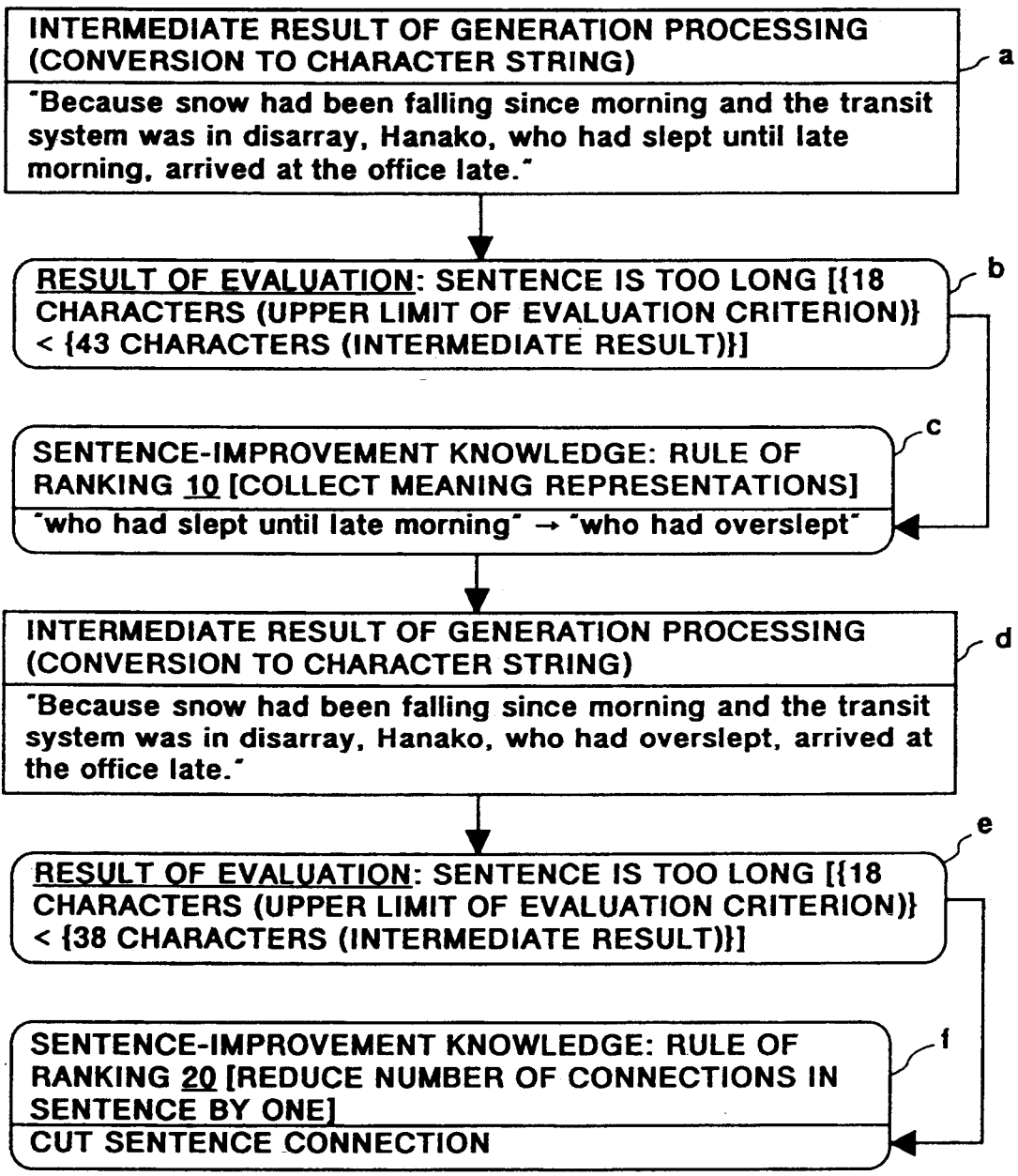
F I G. 14A

SENTENCE GENERATING SYSTEM

BACKGROUND OF THE INVENTION

This invention relates to a sentence generating method and system for generating sentences in a language such as Japanese or English from a semantic representation that has been inputted into the system. Further, the invention relates to an improvement in the sentence style generated when translating a sentence in a first language (Japanese, for example) into a sentence in a second language (English, for example), and more particularly, to a sentence generating method well suited for use in machine translation.

A sentence generating method conventionally adopted in machine translation entails analyzing an inputted sentence in a first language, converting this sentence into a semantic representation and generating a sentence in a second language from this semantic representation. In this conventional method of generating sentences, generally the process for sentence generation is a procedure in which, with regard to a given semantic representation, the word order of a sentence is decided in accordance with grammatical rules, surface words and phrases are selected, and the selected surface words and phrases (expressions) are outputted.

However, since this conventional sentence generation process involves generating a partial sentence from the entirety of a sentence, one cannot take a survey of the whole while such partial generation is in progress. Accordingly, even if part of a sentence is capable of being generated correctly with the conventional approach, a disadvantage is that no consideration is given to the balance of the overall sentence.

For the foregoing reason, contradictions and unnatural wording can occur as a sentence is constructed in accordance with the conventional sentence generating method, and there are cases where sentences that are difficult to comprehend are generated, even though the sentences may not possess any grammatical errors. In particular, when a sentence in a second language generated and outputted according to the conventional method in a machine translating system is not in the native language of the system user, the user is not likely to notice that the outputted sentence is difficult to understand. And even if the user should happen to notice, a high level of linguistic knowledge and proficiency would be required in order to know which portions of the sentence should be revised and in what manner. Moreover, the user would be subjected to a considerable burden if actually required to revise outputted sentences frequently.

SUMMARY OF THE INVENTION

An object of the present invention is to provide a sentence generating system in which the foregoing drawbacks are eliminated by making it possible to generate an easy-to-read sentence style from an inputted semantic representation.

According to the present invention, the foregoing object is attained by providing a sentence generating system for generating a sentence from an inputted semantic representation, comprising limitation storing means for storing a limitation which a generated sentence should satisfy, sentence generating means for generating a sentence from the inputted semantic representation based upon the limitation stored in the limitation storing means, evaluating means for evaluating results generated by the sentence generating means, altering means for altering the limitation, which has been stored in the limitation storing means, based upon an evaluation made by the evaluating means, and re-execution control means for performing control of the system in such a manner that generation of the sentence by the sentence generating means is re-executed based upon the altered limitation.

Another object of the present invention is to provide a sentence generating system capable of generating easy-to-read sentences at a high speed.

Still another object of the present invention is to provide a sentence generating system capable of generating easy-to-read sentences which are not monotonous.

According to the present invention, the foregoing objects are attained by providing a sentence generating system for generating a sentence from an inputted semantic representation, comprising limitation storing means for storing a limitation which a generated sentence should satisfy, sentence generating means for generating a sentence from the inputted semantic representation based upon a limitation stored in the limitation storing means, evaluation-criterion storing means for storing an evaluation criterion that is for evaluating the sentence generated by the sentence generating means, criterion altering means for altering the evaluation criterion stored in the evaluation-criterion storing means, evaluating means for evaluating the sentence, which has been generated by the sentence generating means, in accordance with the evaluation criterion stored in the evaluation-criterion storing means, limitation altering means for altering the limitation, which has been stored in the limitation storing means, based upon the evaluation made by the evaluating means, and re-execution control means for performing control of the system in such a manner that generation of the sentence by the sentence generating means is re-executed based upon the limitation altered by the limitation altering means.

A further object of the present invention is to provide a machine translating system capable of generating translations that are easy to read.

According to the present invention, the foregoing object is attained by providing a machine translating system for translating an inputted sentence in a first language into a sentence in a second language and outputting the sentence in the second language, comprising input means for inputting the sentence in the first language, analyzing means for outputting a semantic representation upon analyzing the sentence in the first language inputted by the input means, limitation storing means for storing a limitation which a sentence generated in the second language should satisfy, sentence generating means for generating the sentence in the second language from the semantic representation based upon the limitation stored in the limitation storing means, output means for outputting the sentence generated in the second language by the sentence generating means, evaluating means for evaluating the sentence generated by the sentence generating means, and re-execution control means having altering means for altering the limitation, which has been stored in the limitation storing means, based upon an evaluation made by the evaluating means, the re-execution control of the system means performing control in such a manner that generation of the sentence in the second language by the sentence generating means is re-executed based upon the altered limitation.

Other objects and advantages besides those discussed above shall be apparent to those skilled in the art from the description of a preferred embodiment of the invention which follows. In the description, reference is made to the accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 8A and 8B are flowcharts illustrating a procedure for sentence-generation processing in the sentence generator according to the second method;

FIGS. 13, 14A and 14B are diagrams for describing the details of the flow of processing in the sentence generator according to the fourth method;

DESCRIPTION OF THE PREFERRED EMBODIMENT

Reference will be made had to the accompanying drawings to render a detailed description of an embodiment in which a sentence generating method according to the present invention is applied to machine translation between English and Japanese sentences.

Figure 1:
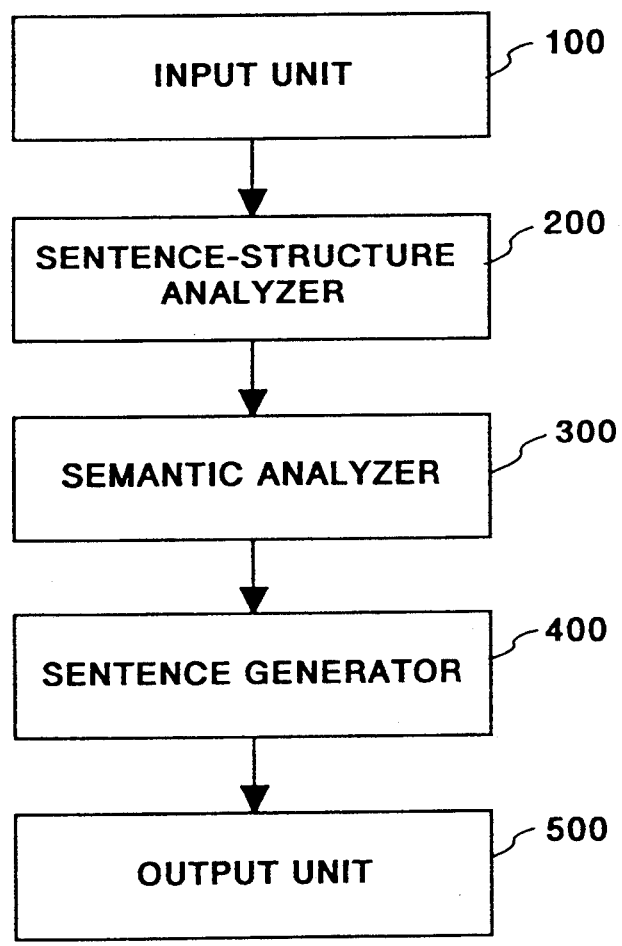
FIG. 1 is a functional block diagram illustrating an embodiment of a machine translating apparatus to which the sentence generating method of the invention is applied.

FIG. 1 is a block diagram illustrating the construction of a common machine translating system for translating a first language into a second language.

Figure 5:
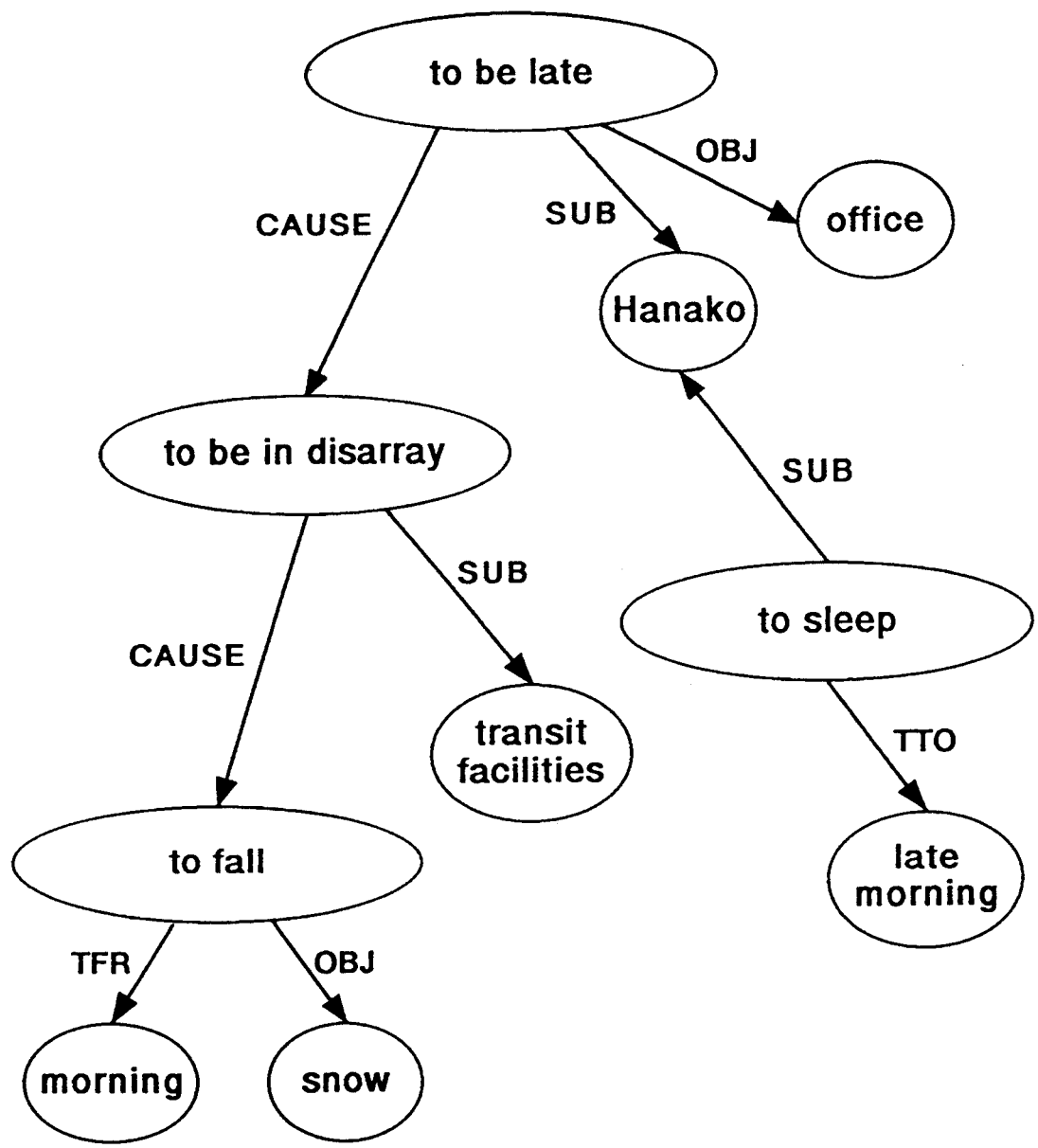
FIG. 5 is a diagram showing an example of a semantic representation which is the subject of sentence-generation processing.

As shown in FIG. 1, an input unit 100 inputs a sentence in the first language. A sentence-structure analyzer 200 analyzes the structure of the inputted sentence in the first language and possesses a knowledge of the parts of speech of the words constituting the sentence in the first language. For languages such as Japanese in which the punctuation between words constructing a sentence is unclear (a so-called agglutinative language), the sentence-structure analyzer 200 executes morpheme analysis in order to break up the sentence into words. Based upon the analytical results from the sentence-structure analyzer 200, a semantic analyzer 300 produces a semantic representation, of the kind shown, for example, in FIG. 5, representing the connection between meaning concepts. In a case where an expression which does not depend upon language characteristics is used in machine translation as a semantic representation, a sentence in a second language can be obtained directly from a semantic representation obtained by analyzing the first language. On the other hand, in a case where the semantic representation is dependent upon language, the semantic analyzer 300 converts the semantic representation in the first language obtained by analyzing the first language into a semantic representation in the second language and then outputs the latter semantic representation. A sentence generator 400 generates a sentence in the second language from the semantic representation outputted by the semantic analyzer 300. An output unit 500 outputs the generated sentence in the second language.

The translating system according to this embodiment is capable of machine translation from English to Japanese and from Japanese to English. The reason for this is that even though the structure of a semantic representation expressing a Japanese sentence differs from that expressing an English sentence, the semantic analyzer 300 is adapted to convert one semantic representation to another.

A major characterizing feature of the system shown in FIG. 1 resides in the method of generating sentences performed by the sentence generator 400. As stated earlier, since the conventional sentence generating process involves generating a partial sentence from the entire of a sentence, one cannot gain an overview of the whole while such partial generation is in progress. Consequently, even if part of a sentence is capable of being generated correctly, a problem encountered is that no consideration is given to the balance of the overall sentence. To understand how the sentence generator 400 solves this problem, first a method of generating a Japanese sentence in an English-to-Japanese machine translation process will be described taking four methods (referred to as first through fourth methods) as examples, and then one method of generating an English sentence in a Japanese-to-English machine translation process will be described. In a case where a Japanese sentence is generated in an English-to-Japanese machine translation process, the semantic representation inputted to the sentence generator 400 has the structure of the Japanese language. In a case where an English sentence is generated in a Japanese-to-English machine translation process, the semantic representation inputted to the sentence generator 400 has the structure of the English language. This will be described later in greater detail.

Among the four methods of sentence generation used in an English-to-Japanese machine translation process, the first method (FIG. 2) of generating a Japanese sentence is such that easy-to-read sentences of superior quality are capable of being generated. The purpose of the second and third methods (FIGS. 7 and 9) of generating Japanese sentences is to raise the processing speed for cases where the quality of the outputted sentences is not required to be that high. The fourth method (FIG. 11) of generating Japanese sentences improves upon monotonous sentences that tend to be generated by the first through third methods owing to sentence-generation processing always executed under the same limited conditions.

First Method of Generating Japanese Sentences

Figure 2:
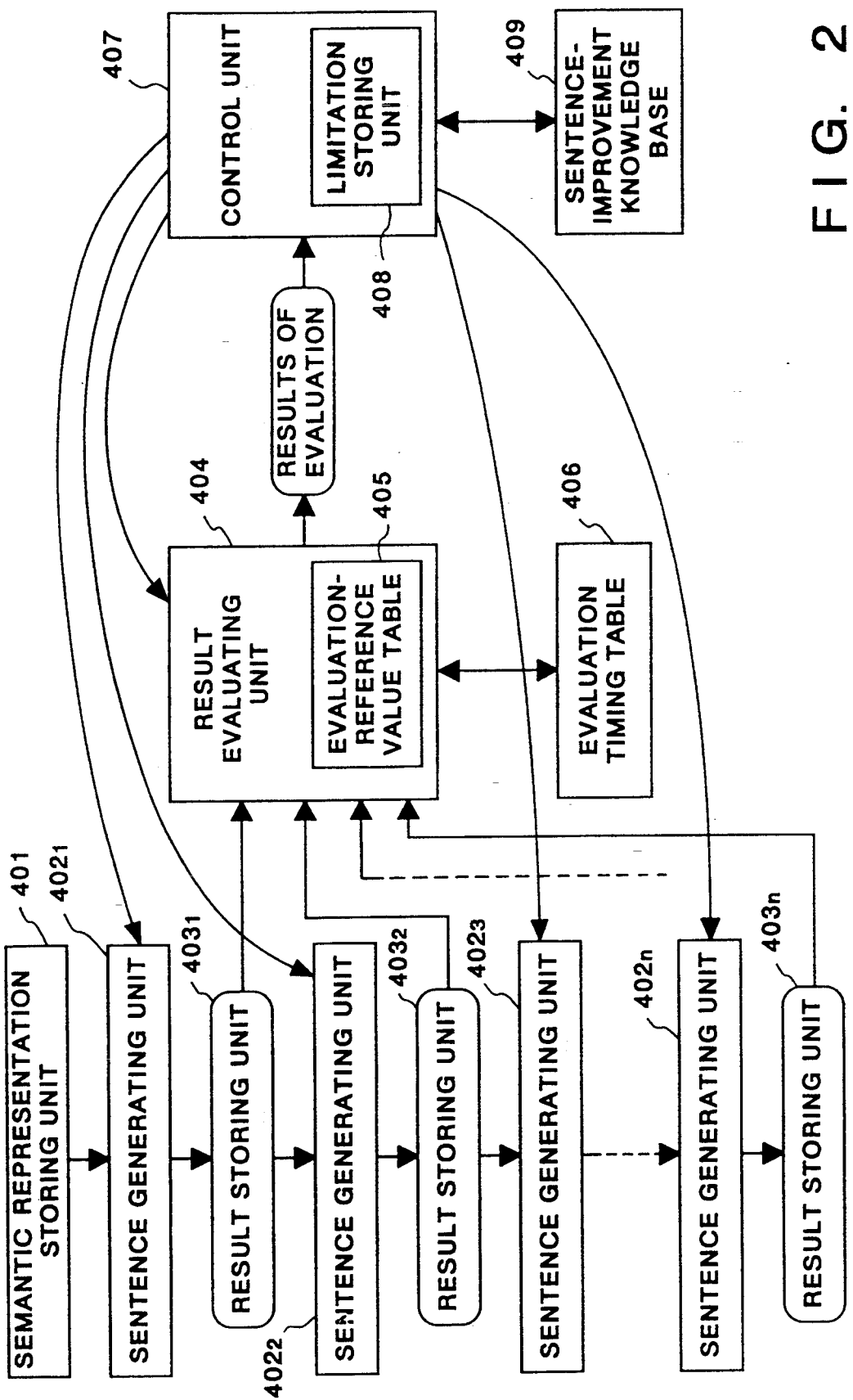
FIG. 2 is a block diagram showing the construction of a sentence generator in the translating apparatus of FIG. 1.

FIG. 2 is a block diagram showing the first method of generating Japanese sentences in the sentence generator 400 constituting the heart of the machine translating system shown in FIG. 1.

Construction and Operation of First Method

As shown in FIG. 2, the sentence generator 400 comprises one semantic representation storing unit 401, n-number of sentence generating units 402, n-number of result storing units 403, one result evaluating unit 404 for evaluating a generated sentence, and one control unit 407 for controlling the sentence generating units 402 and result evaluating unit 404. The semantic representation storing unit 401 receives a sentence to be generated from the semantic analyzing unit 300 (FIG. 1) and holds the sentence in the form of a semantic representation. The semantic representation stored in the semantic representation storing unit 401 enters one ($402_1$) of the n-number of sentence generating units 402, in which a sentence is generated and the result is stored in one ($403_1$) of the n-number of result storing units 403.

The first sentence generating unit $402_1$ performs sentence generation based upon the semantic representation provided by the semantic representation storing unit and stores the result in the result storing unit $403_1$. Thenceforth, and in successive fashion, each sentence generating unit $402_m$ performs sentence generation based upon the sentence stored in the immediately preceding result storing unit $403_{m-1}$, and the result is stored in the immediately succeeding result storing unit $403_m$ (where m=2, 3, ..., n). As will be set forth below, each of the sentence generating units 402 is provided in advance with its own individual function. For example, as shown in Table 1, the sentence generating unit $402_1$ of a module No. 1 has a sentence converting function for performing a conversion between a simple sentence and a compound sentence. Table 1 shows an example of rules for sentence-style improvement used in the result evaluating unit, where the result of the evaluation is "sentence is too long".

TABLE 1

| MOD. NO. | GENERATION PROCESSING | RANK-ING | FREE LIMITATION | ALTERED VALUE |
|---|---|---|---|---|
| 14 | AUXILIARY VERB/ MOOD DECISION | 1 | SURFACE WORD (LONG/SHORT) | SHORT |
| | | 2 | SURFACE WORD (KANJI/HIRAGANA) | KANJI |
| 13 | CONNECTION EXPRESSION DECISION | 3 | SURFACE WORD (LONG/SHORT) | SHORT |
| | | 4 | SURFACE WORD (KANJI/HIRAGANA) | KANJI |
| 8 | PRONOUN/ELL-IPSIS/ PRO-VERB | 5 | PRONOUN/ELLIPSIS/DO NOTHING | PRONOUN |
| | | 6 | PRO-VERB/DO NOTHING | PRO-VERB |
| 5 | DECISION ON OBJECTS, COMPLIMENTS & MODIFIERS | 7 | SURFACE WORD (LONG/SHORT) | SHORT |
| | | 8 | SURFACE WORD (KANJI/HIRAGANA) | KANJI |
| | | 9 | PHRASE-NOUN SEQUENCE/ no-NOUN SEQUENCE/COMPOUND NOUN | no-NOUN SEQUENCE |
| | | 10 | ARRANGE MEANING REPRESENTATIONS | ARRANGE |
| | | 11 | FORMAL ADVERB/ NOUN + CASE-POSTPOSITIONAL WORD | NOUN + CASE |
| | | 12 | CONSOLIDATION | CONSOLIDATE |
| 4 | PREDICATE DECISION | 13 | SURFACE WORD (LONG/SHORT) | SHORT |
| | | 14 | SURFACE WORD (KANJI/HIRAGANA) | KANJI |
| | | 15 | JAPANESE VERB/SA-HEN VERB | SA-HEN |
| | | 16 | CHANGE TO COMPOUND DECLINABLE WORD | EXECUTE |
| | | 17 | ARRANGE MEANING REPRESENTATIONS | ARRANGE |
| | | 18 | PARAPHRASE | EXECUTE |
| 2 | RELATIVE CLAUSE, EMPHASIS | 19 | NUMBER OF RELATIVE-CLAUSE NESTINGS | 3-1 |
| 1 | SIMPLE-SENTENCE COMPOUND SENTENCE | 20 | NUMBER OF CONNECTIONS IN SENTENCE | N-1 |

N REPRESENTS MAXIMUM NUMBER OF CONNECTIONS IN SENTENCE

The result storing unit $403_n$ stores the final output sentence.

The result evaluating unit 404, which evaluates intermediate results generated in the sentence generating process performed by each of the sentence generating units 402, has a table of evaluation reference values. This is a table storing reference values for evaluating the readability of the intermediate results stored in each of the result storing units 403. A timing table 406 designates what kind of evaluation is to be made depending upon the sentence generating process. The reference values referred to here are, for example, reference values of sentence length for determining whether an inputted sentence is too long.

The control unit 407 is for controlling a series of sentence generating processes and has a limitation storing unit 408 which stores various limitations necessary in sentence generation. Table 2 shows the constitution of the limitation data stored in the limitation storing unit 408.

terms of meaning. The semantic representations shown in FIG. 5 are as follows, in Japanese:

"Asa kara yuki ga futteori, kotsu kikan ga midaretanode, asa osokumade neteita Hanako wa kaisha ni chikoku shita." (1)

The semantic analyzer 300 outputs a semantic representation having this meaning in Japanese because the following English sentence has been inputted to the

TABLE 2

| FIXED LIMITATION | | NAME OF LIMITATION "SENTENCE TYPE" "SENTENCE STYLE" | | VALUE "EXPLANATORY SENTENCE" "POLITE" | | |
|---|---|---|---|---|---|---|
| | GENERATION PROCESSING | | NAME OF LIMITATION | CURRENT VALUE | INITIAL VALUE | HISTORICAL INFORMATION |
| FREE LIMITATION | 1 | "SIMPLE-SENTENCE/ COMPOUND-SENTENCE" | "NUMBER OF CONNECTIONS IN SENTENCE" | "2" | "4" | "4", "3" |
| | 2 | "RELATIVE CLAUSE, EMPHASIS" | "NUMBER OF RELATIVE-CLAUSE NESTINGS" | "3" | "3" | |
| | 4 | "PREDICATE DECISION" | "SURFACE WORD (LONG/SHORT)" "SURFACE WORD (KANJI/HIRAGANA)" "JAPANESE-VERB/ SA-HEN VERB" | "INTERMEDIATE LENGTH" "KANJI" "JAPANESE VERB" | "INTERMEDIATE LENGTH" "KANJI" "JAPANESE VERB" | |
| | 14 | "AUXILIARY-VERB/MOOD DECISION" | "SURFACE WORD (LONG/SHORT)" "SURFACE WORD (KANJI/HIRAGANA)" | "INTERMEDIATE LENGTH" "HIRAGANA" | "INTERMEDIATE LENGTH" "HIRAGANA" | |

The control unit 407 has a sentence-improvement knowledge base 409 used when generated results stored in the result storing unit 403 are improved further based upon the evaluation made by the result evaluating unit 404. The sentence-improvement knowledge base 409 designates a sentence improving method based upon the evaluation made by the result evaluating unit 404.

Figure 3:
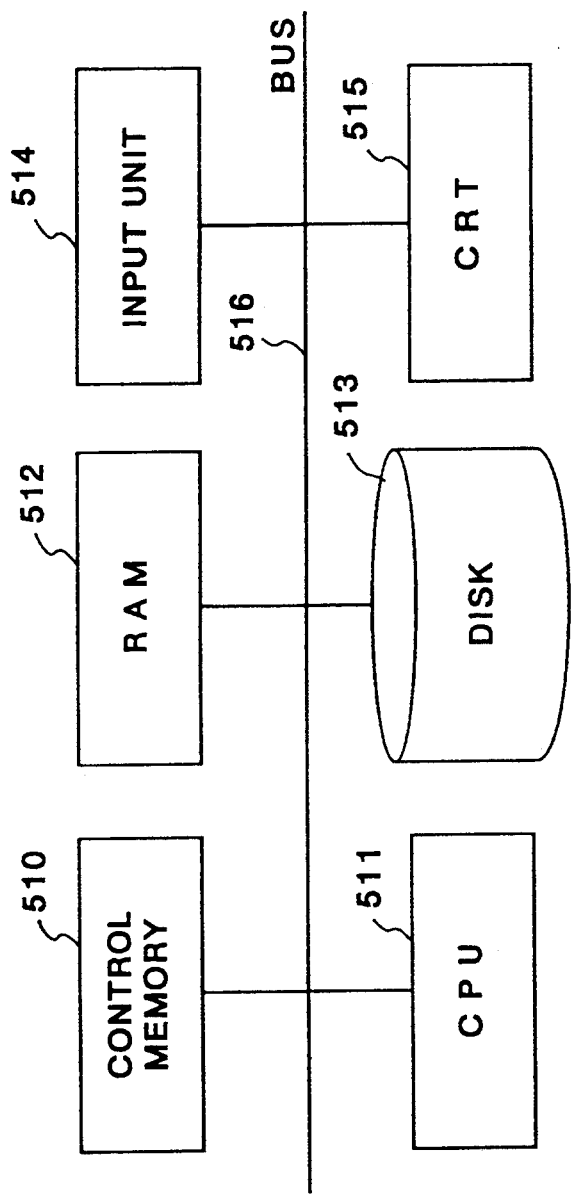
FIG. 3 is a block diagram illustrating the hardware construction of the sentence generator.

FIG. 3 is a diagram for describing the hardware construction of the sentence generator 400. In FIG. 3, a control memory 510 stores various programs inclusive of a program for the processing procedure described later in connection with the flowchart of FIG. 4. A CPU 511 executes various arithmetic operations and decisions in accordance with the above-mentioned programs. A RAM 512 is used as a working memory which stores a given inputted sentence, the results of sentence-structure analysis, semantic representations and the results generated in the sentence generating process. The RAM 512 stores also the limitations necessary for the job. A disk 513 stores the grammar necessary for sentence generation as well as data such as dictionaries. An input unit 514 serves as input means such as a keyboard or a mouse.

The operation of the first method of Japanese-sentence generation shown in FIGS. 2 and 3 will now be described with reference to the flowchart of FIG. 4, a chart of a semantic representation shown in FIG. 5 and the limitation table shown in Table 2.

The apparatus for practicing the first method is for generating a Japanese sentence from inputted semantic representations. In order to make the description more concrete, the semantic representation shown in FIG. 5 will be considered as an example. Here a semantic representation indicates that each word is connected in input unit 100 in the system of FIG. 1 serving as a translating apparatus:

"Because snow had been falling since morning and the transit system was in disarray, Hanako, who had slept until late morning, arrived at the office late." (2)

In FIG. 5, the arrows signify the direction of the connection between words, and what is attached to each arrow expresses the meaning of the connection. For example, the relationship between "to be late" and "to be in disarray" signifies that "to be in disarray" is the "cause" resulting in "to be late". Further, in the sentence of example (2) above, a surface word is assigned to each individual semantic representation in accordance with the tree of FIG. 5. A surface word is a word corresponding directly (in terms of a dictionary) to a given semantic representation. Accordingly, a plurality of surface words are capable of being assigned to any one semantic representation. In FIG. 5, the abbreviation "TTO" represents "time to"; "TFR" represents "time from"; "STO" represents "state to", and "TIM" represents "time".

Thus, the sentence generator 400 for practicing the first method receives the foregoing semantic representations as inputs and generates a sentence comprising surface words. When this has been accomplished, the sentence generator 400 determines that the generated sentence is too long and finally outputs the following two sentences (actually outputted in Japanese, but stated here in English): "Snow had been falling since morning and the transit system was in disarray.", and "Therefore, Hanako, who had slept until late morning, arrived at the office late.".

Figure 4:
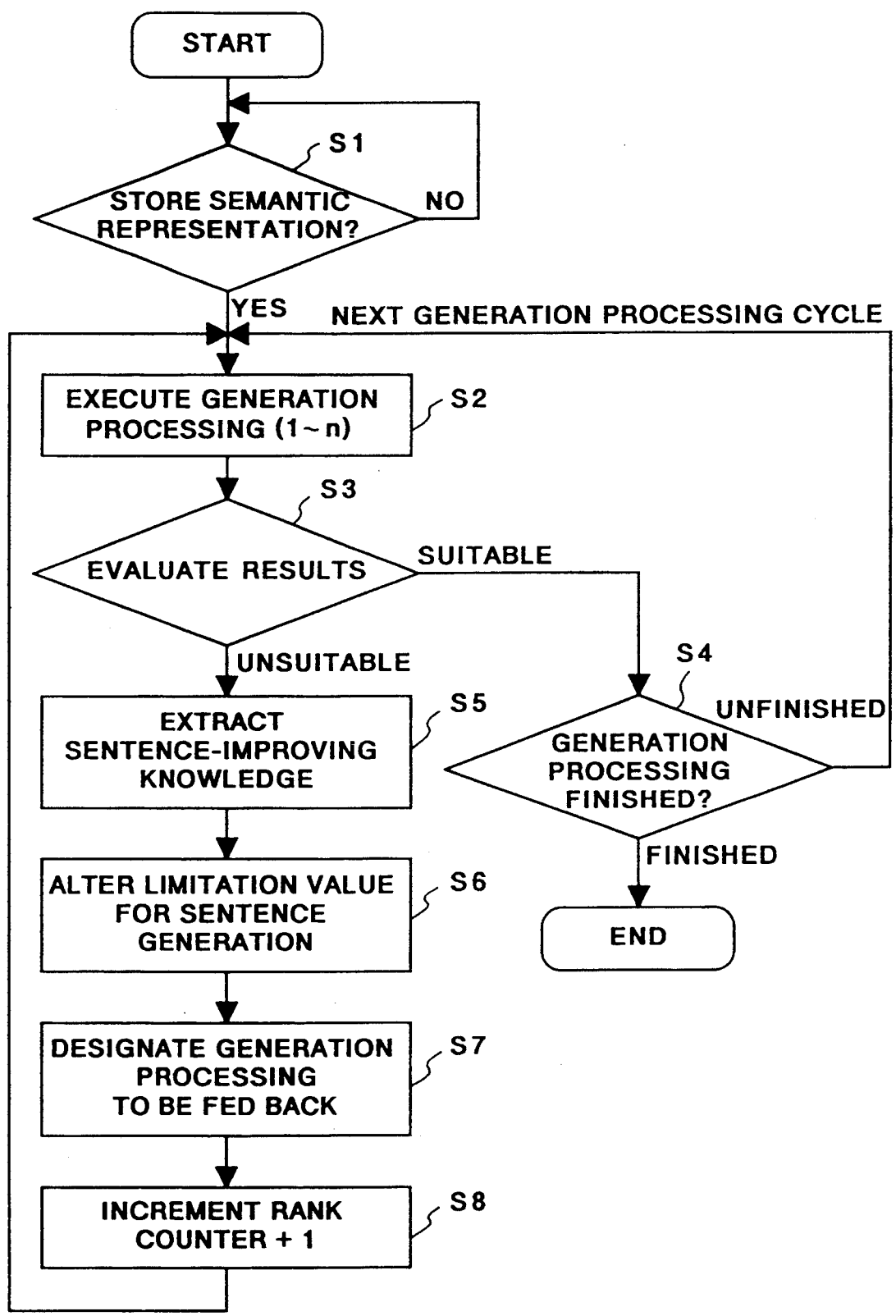
FIG. 4 is a flowchart illustrating a procedure for sentence-generation processing (a first method of generating Japanese sentences) in the sentence generator.

At step S2 of the flowchart in FIG. 4, the system waits for a semantic representation to be fed into the storing unit 401 from the semantic analyzer 300.

The sentence generating process is divided into n parts, and the processing for sentence generation is executed in order by the sentence generating units $402_1$ through $402_n$. When a certain sentence generating unit $402_m$ performs sentence generating processing at step S2, the generated results are stored in the result storing unit $403_m$. At the time of sentence generation, the generating unit 402 processes the given semantic representation using the limitations stored beforehand in the limitation storing unit 408 for sentence generation, and the results are stored in the result storing unit $403_m$.

The term "limitation" for sentence generation means restricting the direction of selection performed during the process of generating a sentence. Limitations are given in table form, one example of which is shown in Table 2.

Limitations are of two types: a fixed limitation, such as "sentence style", in which there is no alteration in the course of generating one sentence; and a free limitation, such as "sentence length", in which there is an alteration in the course of sentence generation. In the example of Table 2, "sentence type" and "sentence style", which are fixed limitations, indicate an "explanatory sentence" or a "polite sentence". In the process of generating a sentence, the sentence is not changed to an interrogative sentence or imperative sentence if it is explanatory. A polite sentence is not changed to an impolite sentence.

Fourteen sentence-processing operations, such as "simple-sentence/compound-sentence conversion processing", "emphasis processing by relative clause", "predicate deciding processing", ..., "auxiliary-verb/-mood decision processing", are prepared in the sentence generator 400. Module numbers of 1 to 14 are assigned to these 14 types of processing. The limitation imposed upon simple-sentence/compound-sentence conversion processing is the number of connections in a sentence. This is the number of clauses. In written Japanese, a sentence with a large number of clauses is of great length. Though such a sentence is easy for the reader to comprehend, it gives an impression of wordiness. Conversely, a sentence with a small number of clauses is short and gives an impression of conciseness. The limitation imposed upon emphasis processing by a relative clause is the "number of relative clauses which are nested" This limitation restricts the number clauses which are nested. In a Japanese/English sentence, a logical impression is given when the number of nestings is high. However, it there are too many nestings, one is given an argumentative impression. The number of nestings has an effect upon sentence length as well.

Three or more limitations are provided for predicate decision processing. These are a limitation relating to the length of a surface word used in a predicate, a limitation as to whether kanji (Chinese characters) or hiragana (the cursive Japanese syllabary) is used in the surface word of a predicate, and a limitation as to whether a Japanese verb or a sa-hen verb is used in the predicate. The sa-hen verb referred to here is a verb peculiar to the Japanese language. When the Japanese word suru (which is equivalent to the word "do" or "perform" in the English language) is attached to an action noun (written in Chinese as a compound word comprising Chinese characters ) which represents the designation of an action, the result (the aforementioned sa-hen verb) can be used as a verb which signifies the performance of the action. For example, the noun of the verb "ugoku" ("move") is "ido" ("movement"), and "ido suru" has the same meaning as the verb "ugoku" ("move" ). Since a sa-hen verb is a combination of a compound word comprising Chinese characters and suru in the Japanese language, it gives the reader an impression of a hard or bookish style. In general, when a sa-hen verb (ido-suru, for example) and the corresponding Japanese verb (ugoku, for example) are compared, there is no difference in meaning but the Japanese verb gives one a gentler or softer impression. This may be understood from the difference in impressions given by "to perform movement" and "to move", for example. In the Japanese language, a Japanese verb and a sa-hen verb having the same meaning differ in that generally the latter requires a large number of characters while the former can be expressed by fewer characters. Accordingly, the limitation is such that whether a Japanese verb or a sa-hen verb is being used has an influence upon sentence length.

A Chinese character (kanji) is an ideogram, and a Japanese hiragana character is a phonetic symbol. Consequently, whether a surface word represented by hiragana or a surface word represented by kanji is selected has an influence upon sentence length, and the length of the sentence is a yardstick of readability.

In the Japanese language, an auxiliary verb is attached to a declinable word or the like to give it various meanings and to assist in description. An auxiliary verb also may be appended to the end of a noun to give it descriptive motion. Accordingly, an auxiliary noun bestows various meanings, such as the passive voice, respect, negation, past tense, perfect tense, conjecture, volition and desire. In the English language, an auxiliary verb is attached to a verb and functions to express mood or tense. Accordingly, the meaning possessed by a generated sentence and the impression given thereby differ considerably depending upon the kind of surface word assigned thereto. In deciding an auxiliary verb or mood, sentence length is influenced by the length selected for the surface word and depending upon whether hiragana or kanji is used.

With regard to each limitation in the various types of sentence generating processing described above, the length of a generated sentence, the quality of the sentence and its readability are decided depending upon which "value" is used for each limitation.

In the sentence generating process, the control unit 407 of the sentence generator 400 alters the "value" of the "limitation" in dependence upon the result of evaluation made by the evaluating unit 404. In Table 2, the "initial value" of a free limitation is a value which prevails when sentence generation starts; the "current value" of a free limitation is the presently prevailing value of the limitation; and the "historical information" of a free limitation records the course of the change in the value of the limitation. The value of a limitation is altered based upon certain rules. The rules for designating how this is done are in the sentence-improvement knowledge base 409.

When sentence generating processing by a certain sentence generating unit $402_m$ ends, the intermediate results are delivered at step S2 to the sentence generating unit $402_{m+1}$ for the next sentence generating step, and sentence generation continues. When one sentence is generated from the semantic representations of FIG. 5 owing to operation of all necessary processing modules in this manner, the generated results are evaluated at step S3. The evaluation is performed by comparing an evaluation value for the results currently obtained and an evaluation reference value given in advance. The reference value can be set in conformity with the level of the reader. If the results of evaluation satisfy the evaluation reference value, then it is determined at step S4 whether sentence generation has been performed with regard to all inputted semantic representations. If all sentence generating processes have ended, the sentence constituting the current result is outputted, and processing is ended.

If, on the other hand, the results of evaluation do not satisfy the evaluation criterion, sentence generation is performed again via the loop composed of steps S5→S6→S7→S8→S2. The steps S5 through S8 constitute a procedure for altering a limitation in order to obtain better results. In other words, this is a procedure for changing the "value" of a limitation.

At step S5, sentence-improvement knowledge conforming to the results of evaluation are extracted from the sentence-improvement knowledge base 409 in order to ascertain what part of the outputted results is inappropriate and how this should be improved.

Figure 6:
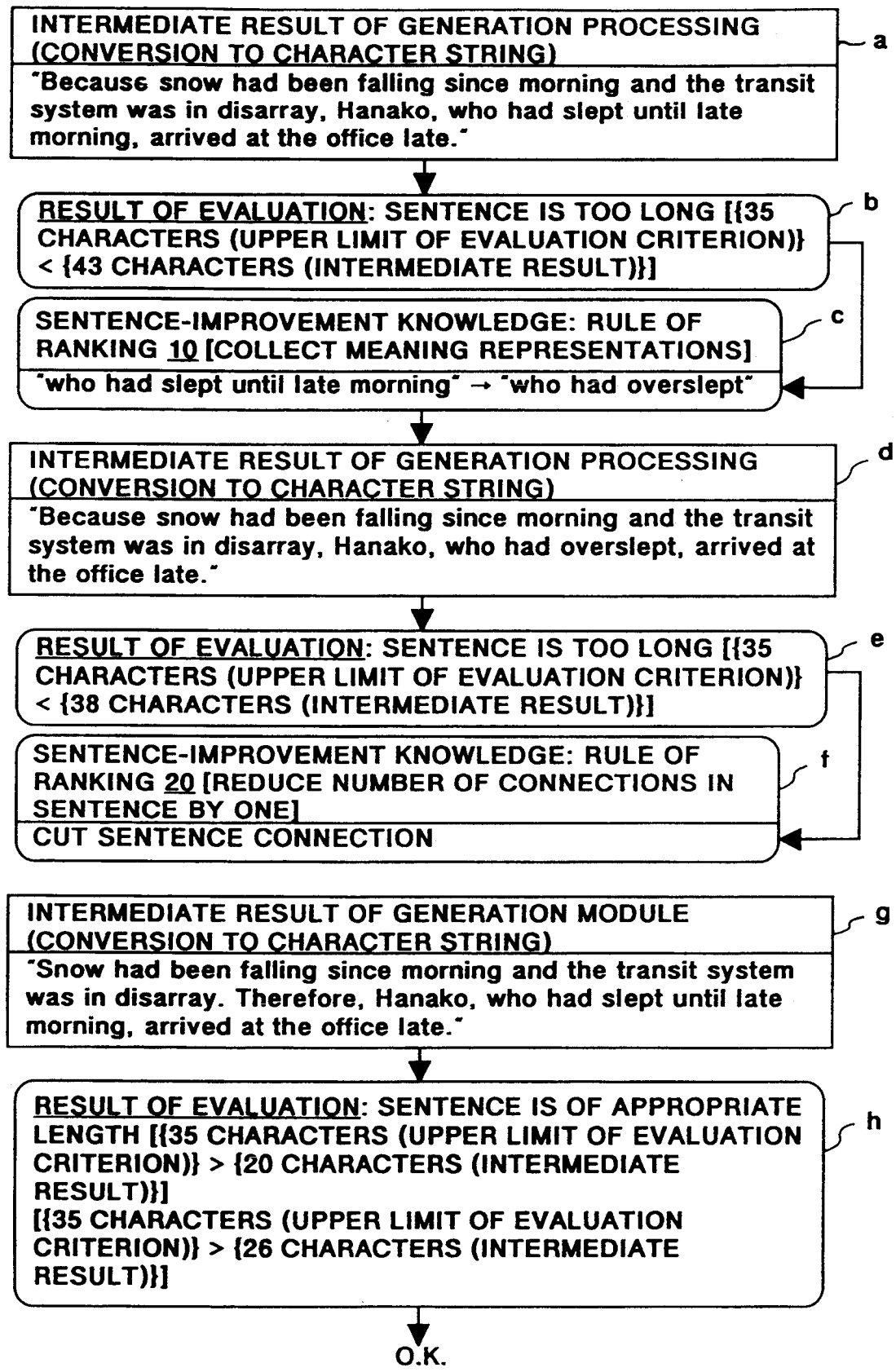
FIG. 6 is a diagram for describing the details of the flow of processing in the sentence generator.

FIG. 6 illustrates the manner in which the generated results and the results of evaluation change in a case where the loop of steps S2 through S7 is applied to the specific example described above.

According to this embodiment, the evaluation of step S3 is made based upon whether the sentence is long or short. It is assumed that a readable Japanese sentence is one that is composed of for example 35 characters or less. Accordingly, the evaluation at step S3 is such that a created sentence is judged to be unsuitable if the sentence has more than 35 characters.

At step S3, the following sentence is evaluated (the sentence given here is in English, although the sentence actually evaluated is in Japanese):

"Because snow had been falling since morning and the transit system was in disarray, Hanako, who had slept until late morning, arrived at the office late." This sentence is the result of sentence generating processing, which each module applies to the semantic representations that are inputted from the semantic analyzer 300, in accordance with the "limitation" of the initial value. This initial output is shown at a in FIG. 6. The output a is composed of a total of 43 characters in Japanese (25 words in English). Since this exceeds the upper limit of 35 characters, which is the evaluation criterion, the evaluation result b ("Sentence is too long.") in FIG. 6 is obtained.

Table 1 illustrates the rules contained in the sentence-improvement knowledge. Specifically, in order to effect an improvement in response to the evaluation result stating that the sentence is too long, the rules indicate which limitation, of which particular sentence-generation module, is to be altered, and in what way.

The sentence (2) above is the result of sentence generation performed in accordance with the limitations (Table 2) of the initial values, based upon the semantic representations of FIG. 5. In a case where the sentence thus generated is judged to be too long and an improvement for shortening the sentence is required, an effective method of shortening the sentence is to select short surface words or select surface words using many kanji. There are other methods of shortening a sentence, examples of which are shown in Table 1.

According to the rules of Table 1, in "auxiliary-verb/mood decision" processing (Module No. 14), an altered value (the initial value is "intermediate length") signifying "short" is given with respect to a limitation signifying "layer word (long/short)", and an altered value (the initial value is "hiragana") signifying "kanji" is given with respect to a limitation signifying "surface word (kanji/hiragana)", thereby expressing a sentence-shortening rule. With regard to "relative clause, emphasis" processing (Module No. 2), the value subtracted by 1 for the limitation "number of nested relative clauses", thereby expressing a sentence-shortening rule.

The sentence generator 400 is so adapted that one sentence generating processing operation overall is broken up and performed by a plurality of generation processing modules in order than a sentence may be generated from semantic representations. As shown in Table 2, these processing modules are, say, fourteen in all, from 1 through 14. In other words, all of the processing operations associated with the 14 modules are carried out at step S2 (n=14) in FIG. 4 and, as a result, a sentence comprehensible by a human being is generated from the semantic representations of FIG. 5. These modules execute the functions with which they have been provided. Since the limitation possessed by a module is related directly or indirectly to the function given to the module, it is possible for a certain module to possess a limitation unrelated to certain sentence-improving rules. Accordingly, a sentence-improving rule describes altered values regarding all limitations that are related to the object of the improvement. In the example of Table 1, the rule is an improvement rule for the evaluation stating that the sentence is too long. For this reason, it is so arranged that two limitations are altered with regard Module No. 14 (auxiliary-verb/mood decision), two limitations are altered with regard to Module No. 13 (conjunction expression decision), two limitations are altered with regard Module No. 8 (pronoun/ellipsis/proverb), six limitations are altered with regard to Module 5 (decisions on objects, compliments and modifiers), six limitations are altered with regard to Module 4 (predicate decision), one limitation is altered with regard to Module No. 2 (relative clause, emphasis), and one limitation is altered with regard to Module No. 1 (simple-sentence/compound-sentence).

Thus, with regard to the sentence-improving rules signifying the shortening of a sentence, the altering of values is decided as knowledge with respect to 20 limitations. These improvement rules written in the sentence-improving knowledge are provided with an order of priority (ranking) in terms of application. This is because it is unnecessary for all improvement rules to be applied at one time. In the example of Table 1, a ranking of 1 to 20 is given for the 20 limitations in the seven processing modules.

Steps S5 through S7 in FIG. 4 describe the alteration of rules. Specifically, the sentence-improving knowledge of the kind shown in Table 1 is extracted at step S5. The value of the "limitation" of a processing module corresponding to value in a rank counter indicating the rank currently undergoing processing is altered at step S6. If the value in the rank counter is "7", for example, the value of the limitation signifying the "surface word (long/short)" of the processing "decision on objects, compliments and modifiers" of the fifth module is altered. The alteration of control values is performed by altering the stored values of the "present values" in Table 2.

At step S7, the processing altered in correspondence to the rank counter is designated. This designation entails designating a processing module which is to be executed again. Here the significance of re-performing processing simultaneously is that only these modules are executed in order at step S2. Step S8 calls for the rank counter to be incremented. Thus, at step S2, only the processing modules designated at step S7 are executed in order. When the processing of step S2 ends, the generated results are evaluated again at step S3.

This will be described using a specific example. In the example of sentence (2), assume that a sentence-improving rule for providing feedback to the processing "decision on objects, compliments and modifiers" and turning on the limitation "arrange sentence semantic representations" of ranking "10" has been used initially in order to shorten the length of a sentence. In such case, "decision on objects, compliments and modifiers" is designated at step S7 as the sentence generating processing to be fed back, and the program then returns to step S2. The processing "decision on objects, compliments and modifiers" is executed at step S2. It will be understood that when the limitation "arrange sentence semantic representations" is applied to the sentence (2), the portion "slept until late morning" is reworded as "overslept", as illustrated at c in FIG. 6. As a result of this change of wording, sentence shortening is achieved to some extent. The sentence d newly created by this processing, namely "Because snow had been falling since morning and the transit system was in disarray, Hanako, who had overslept, arrived at the office late." is re-evaluated by the evaluating unit 404 at step S3. (The above is the English translation; the sentence actually re-evaluated is in Japanese). In the re-evaluation, it is found that the number of characters in the Japanese sentence is 38 (23 in English). Though this represents an improvement, the number of characters still exceeds the upper limit of 35, and therefore the evaluation is that the sentence is too long (evaluation result e).

Based upon the evaluation result e, limitation alteration is performed again in accordance with the sentence-improving rules of Table 1. Now assume that a restriction altering rule signifying "reduce number of connections in the sentence by one" of ranking "20" is applied. This limitation alteration turns on the limitation "split up semantic representations"

When this limitation has been altered, the program again returns to step S2 and "simple-sentence/compound sentence" processing is executed. The semantic representations shown in FIG. 5 are divided at "cause (which connects "to be late" and "to be in disarray"), which represents a connection. At step S2, the semantic representations of FIG. 5 are split up, as a result of which sentence g is created, namely "Snow had been falling since morning and the transit system was in disarray. Therefore, Hanako, who had overslept, arrived at the office late." This created sentence is delivered to the result evaluating unit 403 again, where the sentence is evaluated.

The two sentences resulting from the foregoing division are composed of 20 characters in Japanese (13 words in English) and 26 characters in Japanese (ten words in English), respectively. Since the lengths of these sentences are appropriate, the evaluation criterion is satisfied and processing ends (h in FIG. 6).

Thus, the first method of generating a Japanese sentence makes it possible to obtain an easy-to-read Japanese sentence by inputting semantic representations and then traversing the following loop, in accordance with the limitation conditions: sentence generation→evaluation of generated sentence→alteration of restriction conditions→sentence re-generation→reevaluation evaluation→. . . .

Modification of First Method

Here a modification of the first method is proposed.

In the first method described above, a Japanese sentence is discussed as an illustrative sentence. However, it is possible to adopt languages other than Japanese, such as the English language, by preparing evaluation criteria, limitations and improvement knowledge corresponding to each language.

Though evaluation of a generated sentence is made based upon sentence length, it is permissible to evaluate a generated sentence using another criterion. For example, honorifics are peculiar to the Japanese language. Excessive use of honorifics makes a sentence seem unnatural. Accordingly, the quantification of an index of the level of politeness can serve as a yardstick for evaluating a generated sentence. The index can be quantified by repetition period and number in one sentence, by way of example. A sentence-improving rule is then applied according to which, when level of politeness is evaluated by such quantification, honorifics used in succession, for example, are deleted in a sentence judged to be excessively polite.

According to the first method described above, the semantic representations of one sentence are extracted and processed. However, it is possible to perform sentence generation upon lumping together the semantic representations of a full body of text and adopt this text as the subject of evaluation.

Furthermore, it is possible to revise the evaluation reference values used in the first method by rewriting the table of these evaluation reference values. By making such a revision, sentences suited to readers of a variety of levels can be created.

In the first method described above, an if-then rule is used as the rule employed by the output-sentence evaluating unit 404. However, it is permissible to adopt an arrangement in which a neural network is utilized to perform learning by applying semantic representations and a set of appropriate output sentences corresponding thereto, and performing evaluation based upon the results of learning.

Second Method of Generating Japanese Sentences

In the first method described above, sentence generation and evaluation of the sentence generated are repeated in alternating fashion. As a consequence, outputting a sentence takes time if the evaluation criteria are stringent. Therefore, if the sentence quality required is not that high and it is desired to perform sentence generation at high speed, the first method can cause inconveniences. In addition, since sentences are generated based upon preset evaluation reference values in the first method, the sentences generated are similar in structure and may be monotonous. Accordingly, the second method of the invention described below is adapted to generate easy-to-read sentences at high speed.

Construction and Operation of Second Method

Figure 7:
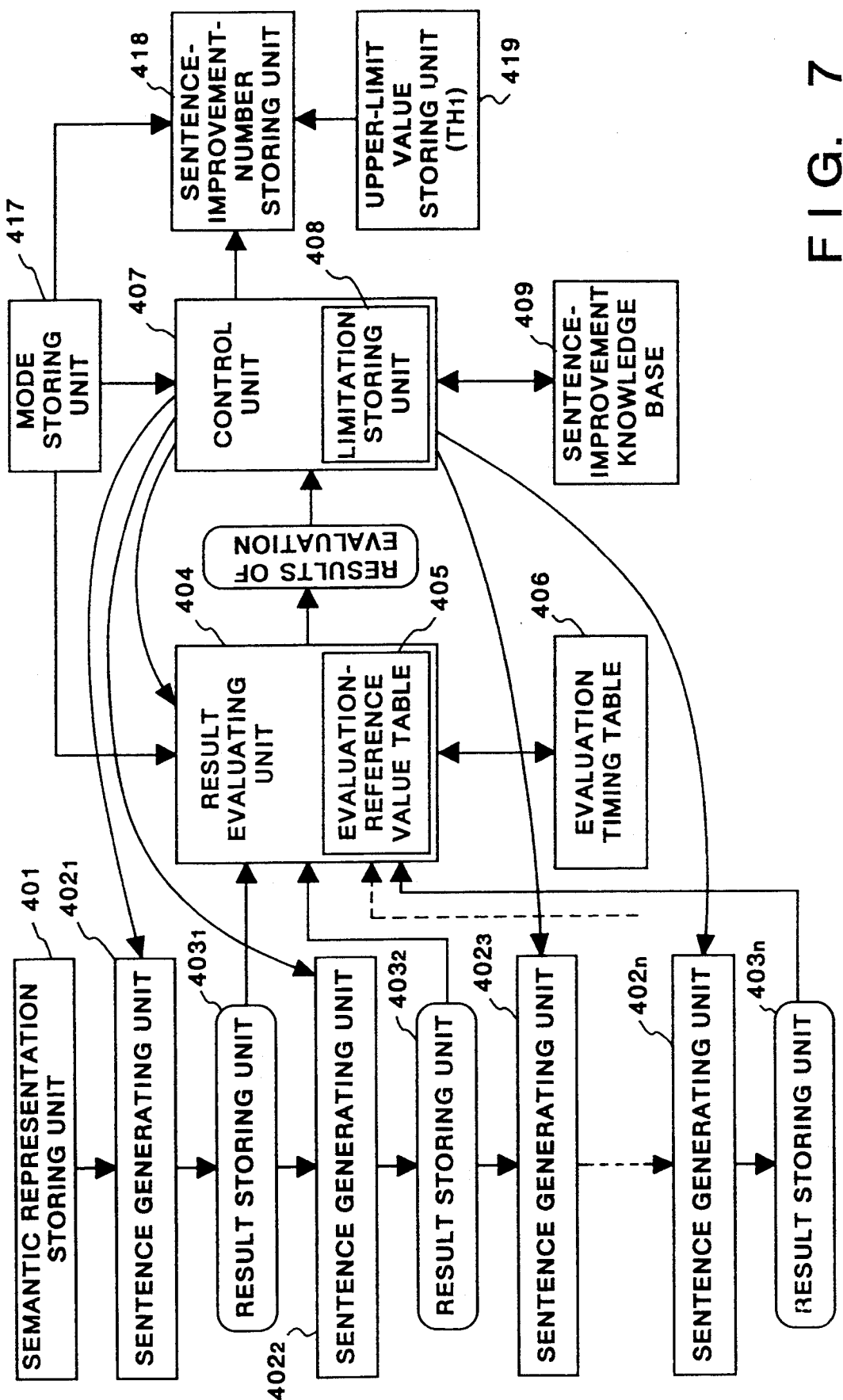
FIG. 7 is a block diagram illustrating the construction of the sentence generator according to a second method.

FIG. 7 is a block diagram illustrating the sentence generator 400 (FIG. 1) for practicing the second method. Portions in the sentence generator 400 of FIG.

7 that are identical with those in FIG. 1 are designated by like reference characters. In the main, only portions that differ from those of the sentence generator 400 for the first method illustrated in FIG. 2 will be described. Newly added elements are a mode storing unit 417, a unit 418 for storing the number of times improvements are made, and an upper-limit value storing unit 419.

The mode storing unit 417 is for storing a sentence generating mode. According to the second method, two modes are available, namely an "improvement mode" and a "high-speed mode", either of which may be selected. If the improvement mode is selected, sentence generation/improvement is carried out in accordance with the first method; if the high-speed mode is selected, the result evaluating unit 404 will not evaluate the results generated by the sentence generating unit 402, and this will make it possible to generate sentences at high speed.

The storing unit 418 is for storing the number of times sentence improvement has been performed in the sentence generator 400. If the number of sentence improvements exceeds an upper-limit value $TH_1$ stored in the storing unit 419, the storing unit 418 instructs the mode holding unit 417 to select the high-speed mode.

The sentence generator for the second method has the hardware configuration shown in FIG. 3.

FIGS. 8A and 8B illustrate a flowchart illustrating a control procedure for sentence generation according to the second method. Initial settings are performed at step S10 of the flowchart. These settings include setting the number of sentence improvements stored in the storing unit 418 to "0" and selecting the improvement mode as the sentence generating mode. Next, the system waits for input of a semantic representation at step S11. When a semantic representation is fed into the meaning-representation storing unit 401, the program proceeds to step S12. The processing of step S12 is the same as that of step S2 of the first method.

When step S12 ends, the mode held in the storing unit 417 is checked at step S13. If the result of the mode check is indicative of the high-speed mode, then it is determined at step S15 whether the entire sentence generating process has ended. If the sentence generation process has ended, the sentence indicative of the current results is outputted and processing is ended.

If the result of the mode check performed at step S13 is indicative of the improvement mode, the results generated are evaluated at step S14. As in the first method, this evaluation is carried out by comparing an evaluation value for the results currently obtained and an evaluation reference value given in advance. If the results of evaluation satisfy the evaluation reference value, then end of processing is determined at step S15.

If, on the other hand, the results of evaluation do not satisfy the evaluation criterion (NO at step S14), sentence generation is performed again to effect an improvement. The number of sentence improvements stored in the storing unit 418 is raised by one at step S16, and it is determined at step S17 whether the number of improvements has attained the upper limit $TH_1$ set in the upper-limit value storing unit 419. If the upper limit has not been attained, then sentence improvement is executed upon changing the limitation in order to obtain better results. Therefore, the program proceeds first to step S18. The processing of steps S18 through S21 is the same as the processing of steps S5 through S8 of the first method. Specifically, the second method also possesses limitations of the kind shown in Table 2 and sentence-improvement knowledge of the kind shown in Table 1.

The process through which a sentence is improved is the same as in the first method.

In the process of improving a sentence, there are cases where the number of times improvement processing is executed exceeds the upper limit stored in the storing unit 419. A case will be described in which the number of improvements has been determined at step S17 to reach the upper limit. When such a determination has been made, the sentence generating operation executed next should be made the last one so that there will be no decline in sentence generating efficiency. Accordingly, the program proceeds from step S17 to step S22, at which the mode held by the mode storing unit 417 is changed to the high-speed mode. As a result, after the program has returned to step S12 and sentence generating processing has been performed, the program branches unconditionally from step S13 to step S15, the generated results are no evaluated and not further improvement is made. Thus, sentence generation is performed at a high speed.

For example, assume the semantic representations of FIG. 5 have been inputted, as in the first method. If the upper limit on the number of improvements is set at one, then the result d (FIG. 6) of the first improvement is no longer evaluated, and the result d is adopted.

Thus, more efficient sentence generation can be achieved by preventing more sentence improvements than are necessary.

Modification of Second Method

When the number of sentence improvements surpasses the upper limit in the second method, the improvement mode or high-speed mode is selected automatically. However, an arrangement may be adopted in which the user selects the mode manually.

Further, when the high-speed mode is established in the second method, results are not evaluated for any of the n-number of sentence generating units 402. However, an arrangement may be adopted in which evaluation is designated independently with regard to the generated results from the individual sentence generating units.

Third Method of Generating Japanese Sentences

The third method described below is for realizing high-speed processing in a manner similar to that of the second method. In the third method, the upper-limit value on the number of sentence improvements is set at two, i.e., high and low, levels. When the number of improvements exceeds the smaller upper-limit value, the evaluation criterion for determining whether or not to improve a generated sentence is gradually relaxed each time an improvement is executed. When the number of improvements exceeds the larger upper-limit value, evaluations are halted and sentence generation is terminated unconditionally. As a result, sentences are generated at a high speed.

Construction and Operation of Third Method

Figure 9:
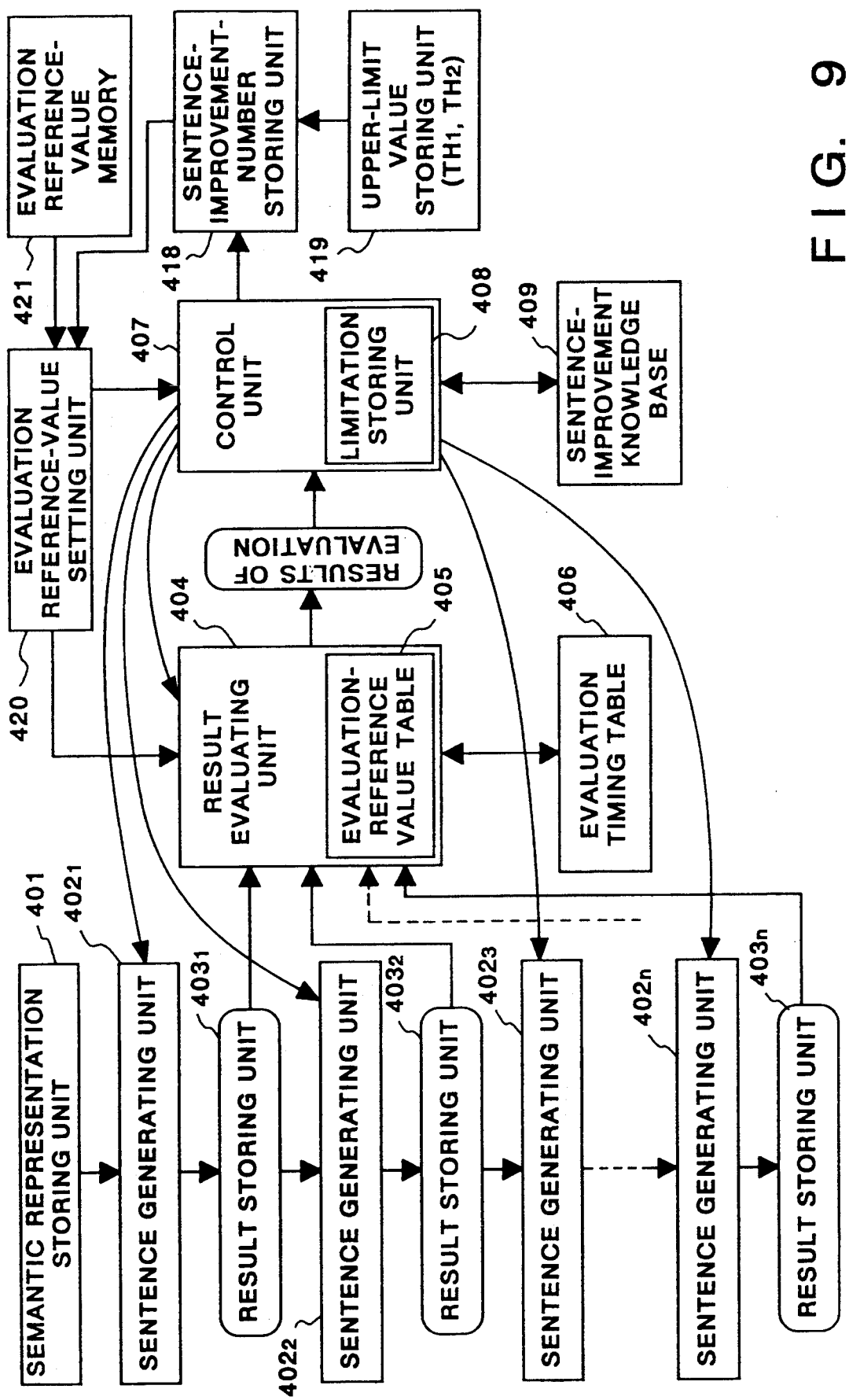
FIG. 9 is a block diagram illustrating the construction of the sentence generator according to a third method.

FIG. 9 is a block diagram illustrating the construction of the sentence generator 400 for practicing the third method. Portions in the sentence generator 400 of FIG. 9 that are identical with those in FIG. 2 are designated by like reference characters. In comparison with the first method, newly added elements are the unit 418 for storing the number of times improvements are made, the storing unit 419 for storing the upper limit on the number of times improvements are made, an evaluation reference-value setting unit 420 for changing and setting reference values in the evaluation reference-value table 405, and a memory 421 for storing new evaluation reference values. The storing units 418 and 419 are the same as those in the second method.

In FIG. 9, the result evaluating unit 404 evaluates the readability of the intermediate results. The evaluation reference-value setting unit 420 reads an evaluation reference value set in the evaluation reference-value table 405 out of the memory 421 and changes the value. In dependence upon the results of comparing the number of improvements held in the storing unit 418 with each of two upper-limit values ($TH_1$, $TH_2$) held in the upper-limit value storing unit 419, the evaluation reference-value setting unit 420 decides which reference value stored in the memory 21 to use. The upper-limit value storing unit 419 stores the two upper-limit values ($TH_1$, $TH_2$) of the number of improvements, as mentioned earlier. If the number of times improvements are performed surpasses the first upper-limit value $TH_1$, the evaluation reference-value setting unit 420 relaxes an evaluation reference value L.

An arithmetic expression on the basis of which the reference value is relaxed by the evaluation reference-value setting unit 420 is shown below. Let M represent the results of evaluation outputted by the evaluating unit 404 immediately before the first upper-limit value $TH_1$ is attained, and let $L_0$ represent the current evaluation reference value, which is close to M. A new evaluation threshold value $L_1$ is given by the following:

$$L_1 = L_0 + (M - L_0)/2 \qquad (3)$$

If the number of sentence improvements exceeds the second upper-limit value $TH_2$, the evaluation reference-value setting unit 420 relaxes the evaluation reference value L to the maximum degree so that any sentence will fall within tolerance.

The hardware configuration of the sentence generator 400 for practicing the third method is the same as that described in connection with FIG. 3.

Figure 10A:
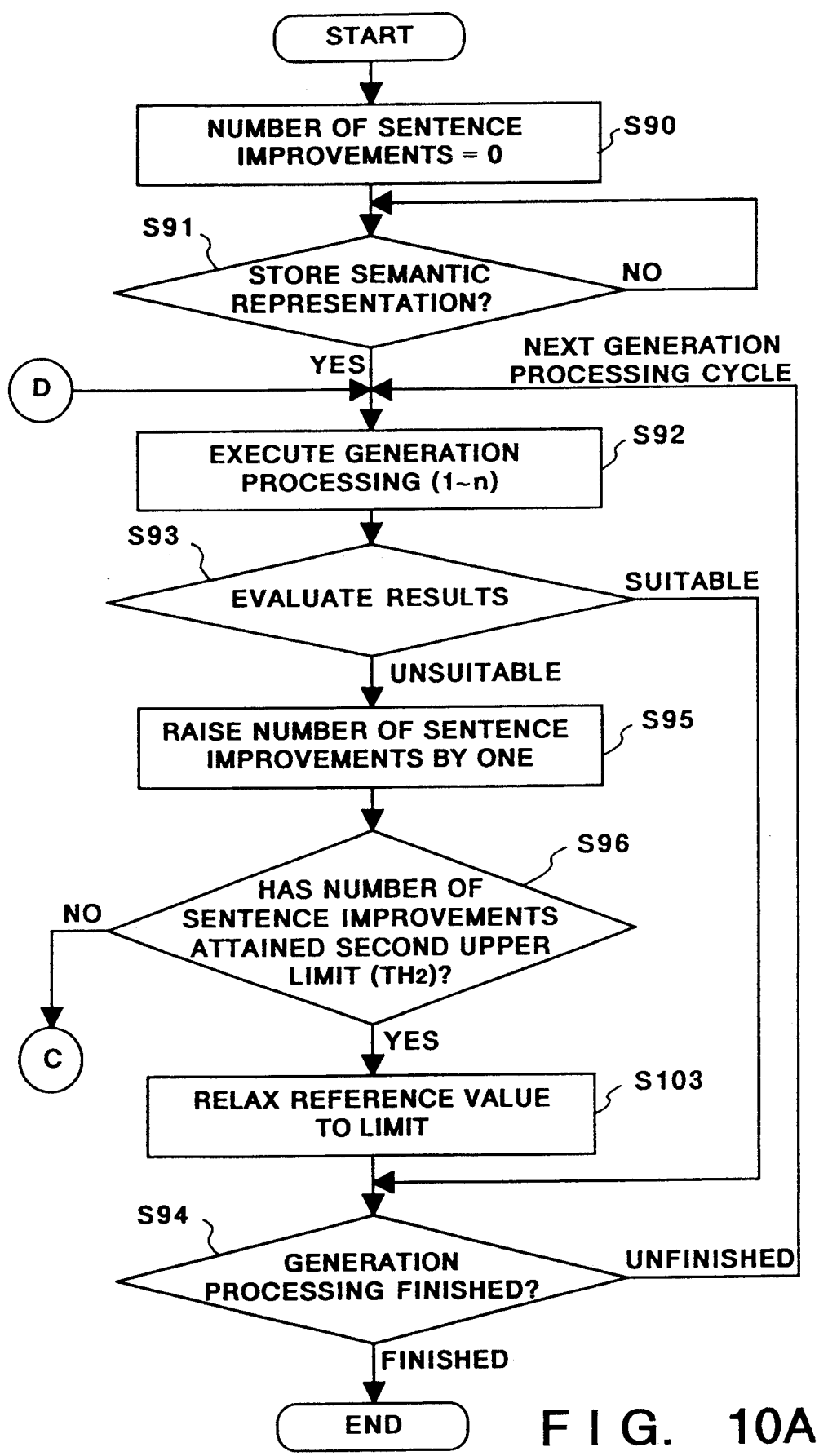
FIGS. 10A and 10B are flowcharts illustrating a procedure for sentence-generation processing in the sentence generator shown in FIG. 11.
Figure 10B:
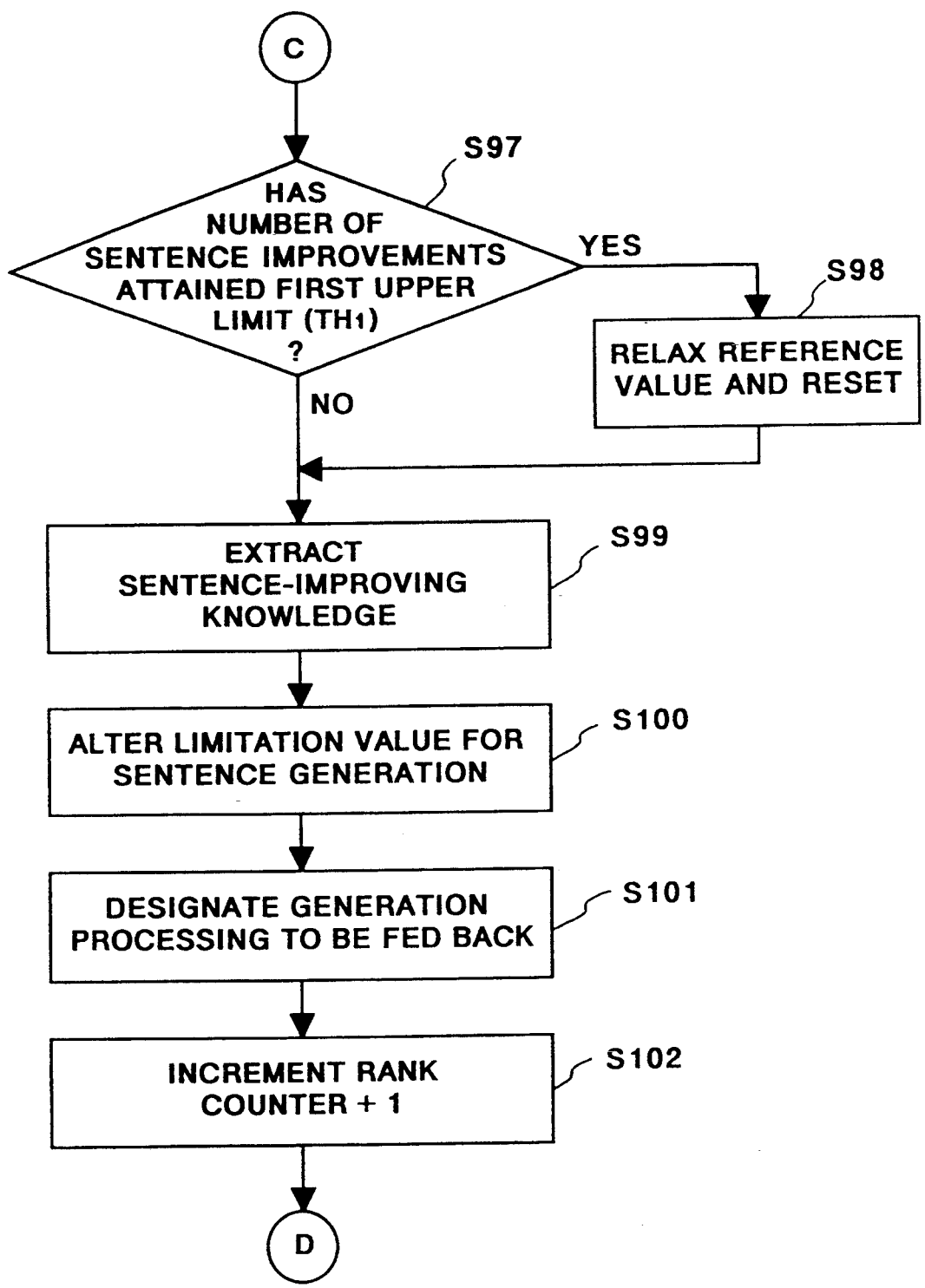

The processing procedure according to the third method will now be described with reference to the flowchart shown in FIGS. 10A and 10B.

First, the processing of steps S90 through S94, which involve generating a sentence and obtaining results which satisfy the evaluation reference value L, correspond to the loop of steps S10 through S15 of FIGS. 8A, 8B minus the processing relating to mode.

If it is determined at step S93 that the results of evaluation do not satisfy the evaluation criterion, sentence generation is performed again to improve the sentence. To this end, the number of sentence improvements stored in the storing unit 418 is raised by one at step S95, and it is determined at step S96 whether the number of improvements has attained the larger upper limit $TH_2$ (>$TH_1$). If the upper limit value $TH_2$ has not been attained, then it is determined at step S97 whether the number of improvements has attained the first (smaller) upper limit $TH_1$.

If it is found at step S97 that the first upper-limit value has been attained, then the new evaluation reference value $L_1$ obtained in accordance with Eq. (3) is set. If the first upper-limit value is exceeded, or even if it is not exceeded, the number of sentence improvements stored in the storing unit 418 is raised by one at step S98. Then, in order to obtain better results, steps from S99 onward are executed.

On the other hand, if it is found at step S96 that the number of sentence improvements has exceeded the second upper-limit value $TH_2$, then the evaluation reference value is relaxed to the maximum degree at step S102, after which the program proceeds to step S94.

Thus, a generated Japanese sentence is improved in an efficient manner. The third method differs from the second method in that the reference value serving as a criterion for determining whether sentence improvement is to continue is relaxed in a gradual manner. According to the second method, the determination as to whether sentence improvement is to continue is made based solely upon a comparison with one reference value. Thus, the third method provides a higher level of improvement than the second method.

Modification of Third Method

In the third method described above, two upper limits on the number of sentence improvements are set. However, an arrangement may be adopted in which only one upper limit is set and the criterion is gradually relaxed if this upper limit is exceeded.

Another arrangement may be adopted in which no upper limit is set but sentence improvement is carried out while gradually relaxing the criterion from the outset.

Further, in the embodiment described above, a reference value is set for every sentence by the evaluation reference-value setting unit 405. As a consequence, even if an evaluation reference value is relaxed, the original evaluation reference value is used when the next sentence is generated. However, an arrangement is permissible in which a reference value once relaxed is held in memory.

Fourth Method of Generating Japanese Sentences

In the first and second methods described above, the reference value L for evaluating sentence generation is fixed at all times. In the third method, the reference value L, though not fixed, is altered so as to become a uniformly gentle value. However, when the reference value is set fixedly or so as to vary uniformly, the structure of generated sentences closely resemble one another and the sentences become too simple. According to the fourth method, monotonous sentences are prevented. To accomplish this, the evaluation reference value L, which serves as a yardstick for generating a sentence, is provided with an oscillatory nature whereby generated sentences are endowed with diversity. This makes it possible to diminish any monotony which the reader may experience.

Construction and Operation of Fourth Method

Figure 11:
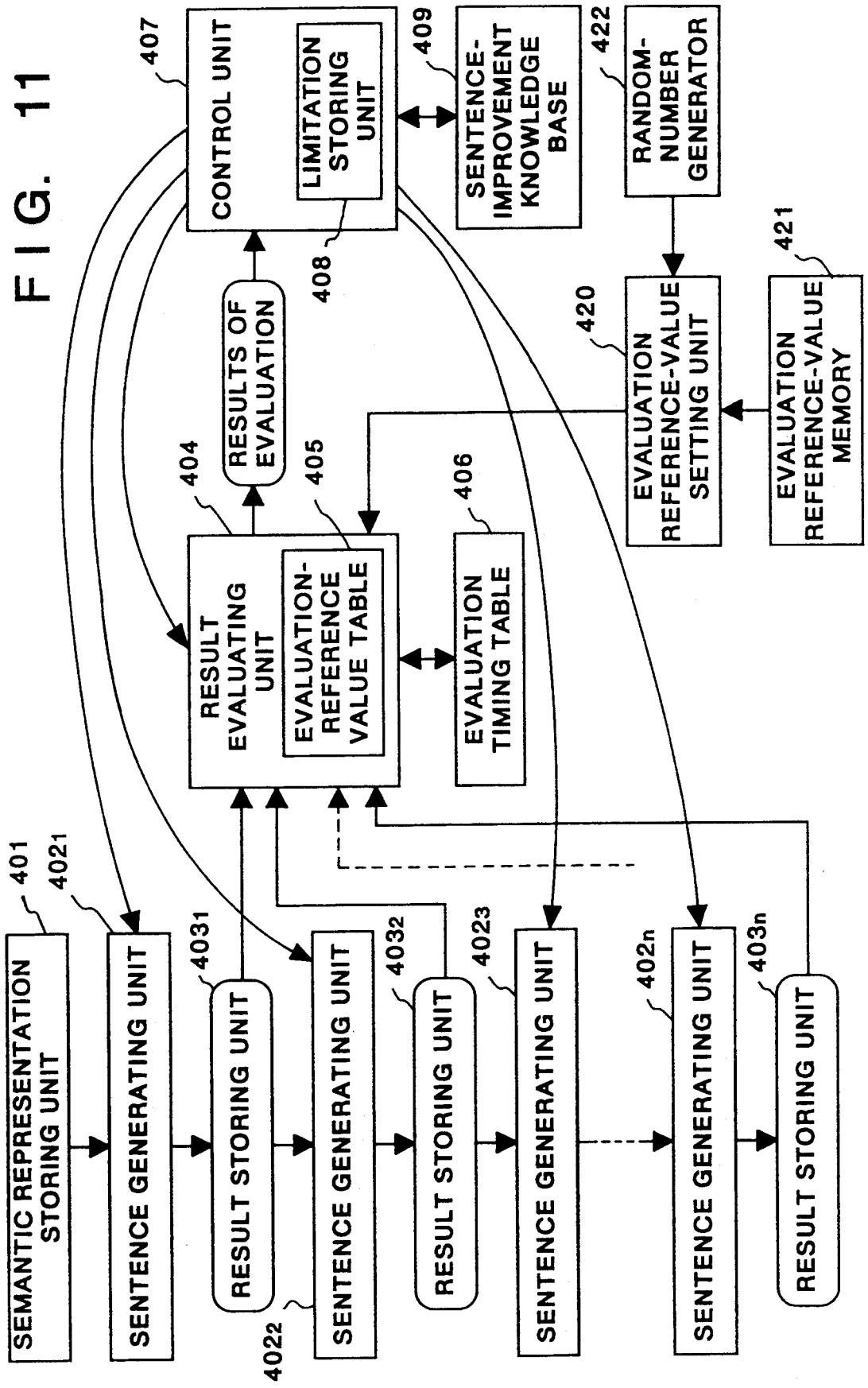
FIG. 11 is a block diagram illustrating the construction of the sentence generator according to a fourth method.

FIG. 11 is a block diagram illustrating an example of the construction of the sentence generator 400 to which the fourth method is applied.

The feature of the fourth method which distinguishes it from the third method of FIG. 9 is that the unit 418 for storing the number of sentence improvements and the unit 419 for storing the upper-limit value of FIG. 9 are deleted and a random-number generating unit 22 is provided. As a result, the evaluation reference-value setting unit 420, instead of referring to the number of times sentence improvement is executed, as is done in the second and third methods, uses a random number generated by the random-number generating unit 422.

More specifically, a reference value set beforehand in the evaluation reference-value 421 is provided with an oscillatory nature by a random value generated by the random-number generating unit 18, thereby setting a new reference value for every sentence.

Figure 12:
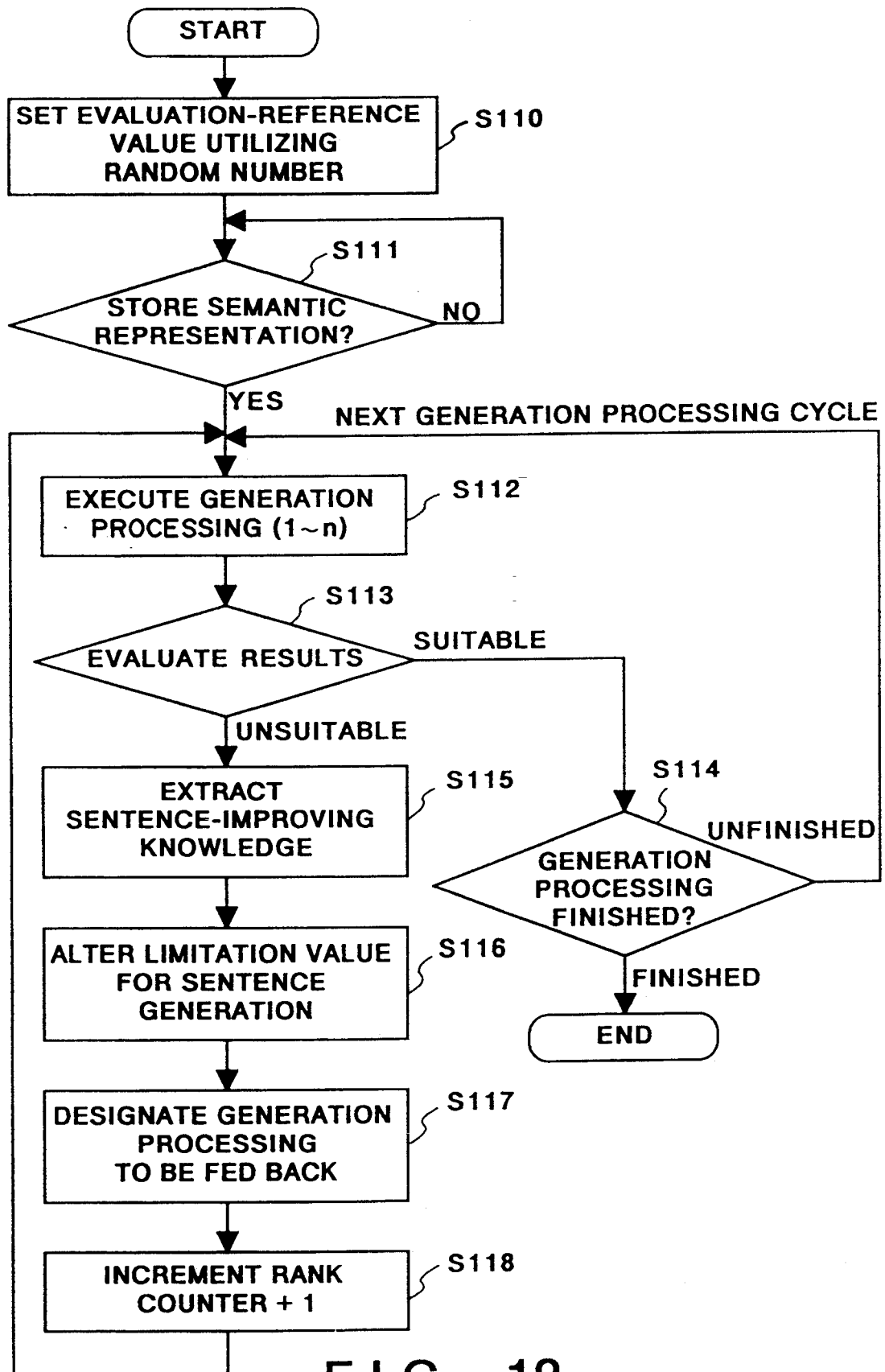
FIG. 12 is a flowchart illustrating a procedure for sentence-generation processing in the sentence generator shown in FIG. 11.

FIG. 12 is a flowchart illustrating operation according to the fourth method. With the exception of step S110, at which use is made of a random number to set an evaluation reference value for every sentence, the steps of this flowchart are the same as those shown in FIGS. 8 and 10.

FIGS. 13 and 14 illustrate the evaluation of a sentence generated in the fourth method, as well as the transition of sentence re-generation for improvement purposes. In order to simplify the description, the discussion of evaluation particulars will be limited to sentence length only.

A procedure for changing the evaluation reference value L by means of a random value will be described first. As for sentence length given as the evaluation reference value, the initial value $L_{LI}$ of a lower limit $L_L$ shall be 0 (characters), and the initial value $L_{MI}$ of an upper limit $L_M$ shall be 35 (characters). The random-number generating unit 18 generates a random number R having a value ranging from $-0.5$ to $+0.5$ (an adjustment of $\pm 50\%$ is possible).

Execution Example 1

FIG. 13 illustrates an execution example for a case where $R = +0.3$.

A lower-limit value $L_{L1}$ and an upper-limit value $LM_1$ of a new reference value $L_1$ which prevail when a reference value $L_0$ is changed to the new reference value $L_1$ are set as follows:

$$L_{L1} = L_{L0} + L_{L0} * R = 0 + 0 * 0.3 = 0$$

$$L_{M1} = L_{M0} + L_{M0} * R = 35 + 35 * 0.3 = 46$$

where $L_{L0} = L_{LI}$, $L_{M0} = L_{MI}$ hold initially.

The initial generated result a (FIG. 13) regarding sentence (2) which is the example in the first method is "Because snow had been falling since morning and the transit system was in disarray, Hanako, who had slept until late morning, arrived at the office late.". Since the length of this sentence (in Japanese) is 43 characters, the evaluating unit 404 decides that it falls within the set range (greater than 0 characters and less than 46 characters) of evaluation reference values (step S113), and sentence generation ends as a result. Since no sentence improvement is made, Japanese-sentence generation is performed at high speed.

Execution Example 2

Figure 14B:
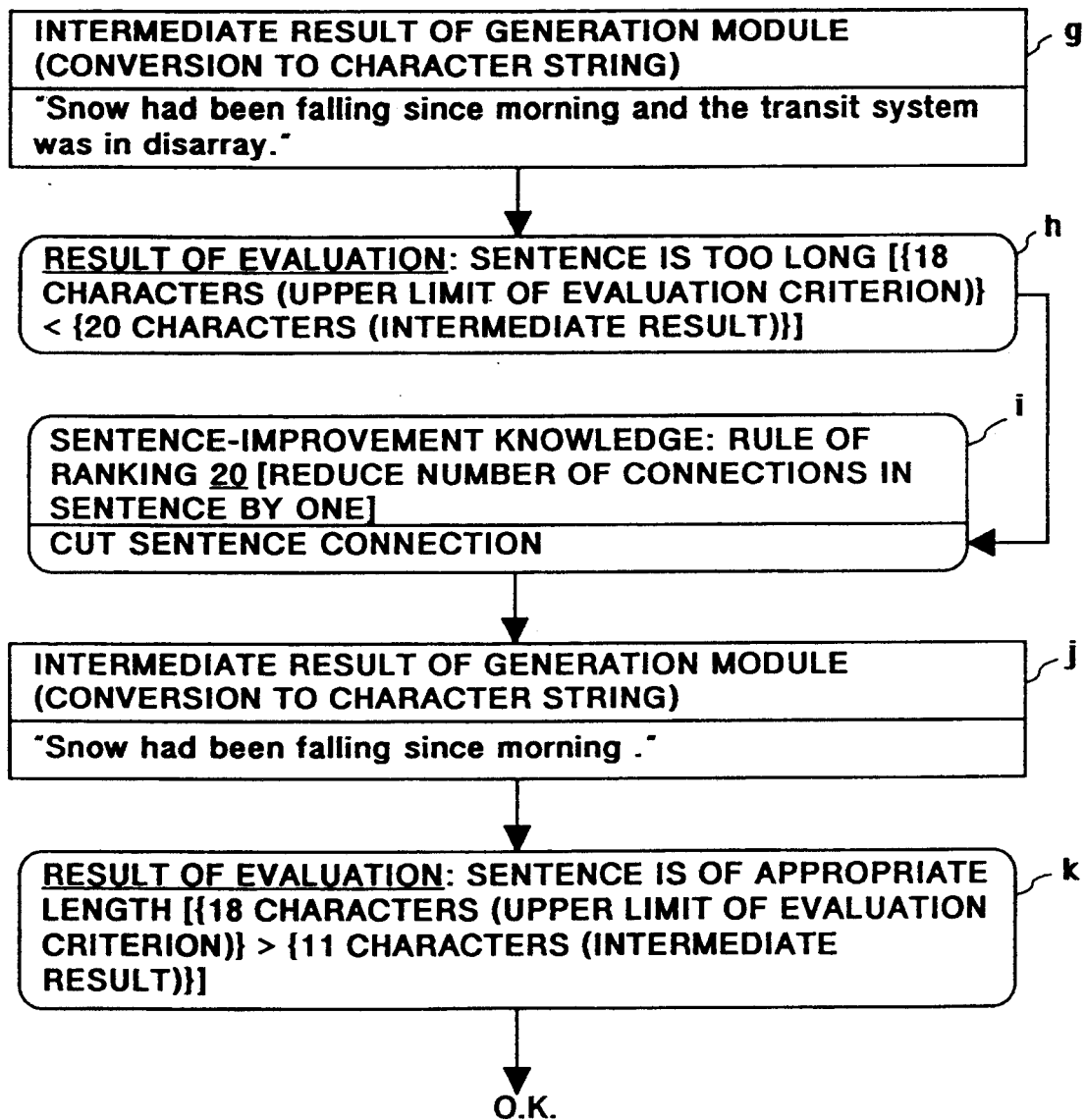

An example for a case where $R = -0.5$ holds is shown in FIGS. 14A and 14B.

A lower-limit value $L_{L1}$ and an upper-limit value $L_{M1}$ of a new reference value $L_1$ are set as follows:

$$L_{L1} = L_{L0} + L_{L0} * R = 0 + 0 * (-0.5) = 0$$

$$L_{M1} = L_{M0} + L_{M0} * R = 35 + 35 * (-0.5) = 18$$

In FIGS. 14A and 14B, a through f differ from a through f of FIG. 6 (the first method) in terms of the reference value, but the results of evaluation and the processing are exactly the same. Therefore, these need not be described again. In g of FIG. 14B, the first of the two sentences resulting from division is adopted as the object of subsequent processing. Though the length of this sentence is 20 characters in Japanese (13 words in English), this still is not less than the 18 characters serving as the evaluation reference value. The result is evaluation h, which signifies that the sentence is too long.

In response, in accordance with the sentence-improvement rule of Table 1, the limitation which splits up the semantic representation is turned on again according to rule i, namely "reduce connections in sentence by one".

When the limit at ion is changed, the program proceeds to sentence generation at step S112 again. The semantic representations shown in FIG. 5 are now split at the connection joining "to be in disarray" and "to fall".

At step S112, the sentence "Snow had been falling since morning" (j in FIG. 14B) is generated by splitting the semantic representations.

The generated sentence is delivered to the result storing unit 403 again, where the sentence is evaluated again. The length of the sentence resulting from the final division is 11 characters (in Japanese), which is less than the evaluation reference value (18 characters). Processing ends as a result.

Since the first sentence of the two sentences resulting from division has a length of 11 characters, which satisfies the evaluation reference value, sentence generation ends. The sentence beginning "Transit facilities . . . " is generated through a similar method after a new evaluation reference value is set again upon taking the oscillatory nature of reference value L into account.

Thus, according to the fourth embodiment, generated sentences do not become monotonous because of the oscillatory nature of reference value L.

Modification of Fourth Method

In the fourth method, the range of oscillation of the evaluation reference value is $\pm 50\%$. However, it can be arranged so that the range may be designated by the user.

Though the range of oscillation is made a percentage with respect to the reference value in the fourth method, the range may be limited according to the number of characters.

Further, in a case where the sentence improving rules become exhausted before the reference value is satisfied in the fourth method, sentence generation is suspended. However, if the sentence improving rules become exhausted, it is possible to resume sentence generation upon resetting the evaluation reference value.

In the fourth method, a Japanese sentence is discussed as an illustrative sentence. However, it is possible to adopt languages other than Japanese, such as the English language, by preparing evaluation criteria, limitations and improvement knowledge corresponding to each language.

In the fourth method, the semantic representations of one sentence are extracted and processed. However, it is possible to perform sentence generation upon lumping together the semantic representations of a full body of text and adopt result as the subject of evaluation.

Furthermore, it is possible to alter the evaluation reference value in dependence upon the level of the reader. As a result of this alteration, sentences conforming to the particular reader can be generated.

There is the risk that an endless loop will be formed not only by designating repeated limitations of sentence generation a number of times but also when sentences having the same state are generated. According, an arrangement can be adopted in which sentence generation is terminated forcibly.

In the fourth method described above, an if-then rule is used as the rule employed by the result evaluating unit. However, it is permissible to adopt an arrangement in which a neural network is utilized to perform learning by applying semantic representations and a set of corresponding appropriate output sentences corresponding, and performing evaluation of an outputted sentence based upon the results of learning.

The present invention is applicable to a system composed of a plurality of devices or to a single device. It goes without saying that the invention is applicable also to a case where a system or device is supplied with a program.

Advantages of Second through Fourth Methods

In accordance with the second through fourth methods, as described above, a generated sentence is evaluated promptly and the results of the evaluation are fed back. Accordingly, an easy-to-read sentence can be generated and high-speed processing can be achieved by limiting this feedback as required. In addition, generated sentences can be prevented from becoming monotonous by applying a variation to the reference value used for evaluation.

Generation of English Sentences

The example described above relates to generation of a Japanese sentence from an inputted English sentence and improvement of the generated Japanese sentence in the translating system of FIG. 1. The example described below relates to a method of improving an English sentence in the sentence generator 400 when a Japanese sentence is inputted to the translating system of FIG. 1 and an English sentence is outputted by the system.

The construction of the sentence generator 400 is as illustrated in FIGS. 2 and 3 for Japanese-to-English translation as well. However, the limitations possessed by the limitation storing unit 408 (FIG. 2) are as illustrated in Table 3, and the sentence-improvement knowledge base is as shown in Table 4, where the result of the evaluation is "sentence is too long".

TABLE 3

| FIXED LIMITATION | NAME OF LIMITATION "SENTENCE TYPE" | | VALUE "EXPOSITION" | | |
|---|---|---|---|---|---|
| | GENERATION PROCESSING | NAME OF LIMITATION | CURRENT VALUE | INITIAL VALUE | HISTORICAL INFORMATION |
| FREE LIMITATION | 1 | SIMPLE-SENTENCE/ COMPOUND-SENTENCE | NUMBER OF CONNECTIONS IN SENTENCE | 2 | 4 | 4, 3 |
| | 2 | RELATIVE CLAUSE | NUMBER OF RELATIVE-CLAUSE NESTINGS | 3 | 3 | |
| | 4 | PREDICATE DECISION | LENGTH OF LAYER WORD (LONG/SHORT) | middle | middle | |
| | ... | | | | | |
| | 14 | AUXILIARY-VERB/MOOD DECISION | LENGTH OF LAYER WORD (LONG/SHORT) | middle | middle | |

TABLE 4

| MOD. NO. | GENERATION PROCESSING | RANK | FREE LIMITATION | ALTERED VALUE |
|---|---|---|---|---|
| 14 | AUXILIARY VERB/ MOOD DECISION | 1 | SURFACE WORD (LONG/SHORT) | SHORT |
| 13 | CONNECTION EXPRESSION DECISION | 3 | SURFACE WORD (LONG/SHORT) | SHORT |
| 8 | PRONOUN/ ELLIPSIS/ PRO-VERB | 5 | PRONOUN/ELLIPSIS/DO NOTHING | PRONOUN |
| | | 6 | PRO-VERB/DO NOTHING | PRO-VERB |
| 5 | DECISION ON OBJECTS, COMPLIMENTS & MODIFIERS | 7 | SURFACE WORD (LONG/SHORT) | SHORT |
| | | 9 | RELATIVE CLAUSE/COMPOUND NOUN | RELATIVE CLAUSE |
| | | 10 | ARRANGE MEANING REPRESENTATIONS | ARRANGE |
| | | 12 | CONSOLIDATION | CONSOLIDATE |
| 4 | PREDICATE DECISION | 13 | SURFACE WORD (LONG/SHORT) | SHORT |
| | | 16 | CHANGE TO COMPOUND DECLINABLE WORD | EXECUTE |
| | | 17 | ARRANGE MEANING REPRESENTATIONS | ARRANGE |
| | | 18 | PARAPHRASE | EXECUTE |
| 2 | RELATIVE CLAUSE, EMPHASIS | 19 | NUMBER OF RELATIVE-CLAUSE NESTINGS | 3-1 |

TABLE 4-continued

| MOD. NO. | GENERATION PROCESSING | RANK | FREE LIMITATION | ALTERED VALUE |
|---|---|---|---|---|
| 1 | SIMPLE-SENTENCE COMPOUND SENTENCE | 20 | NUMBER OF CONNECTIONS IN SENTENCE | N-1 |

N REPRESENTS MAXIMUM NUMBER OF CONNECTIONS IN SENTENCE

Figure 15:
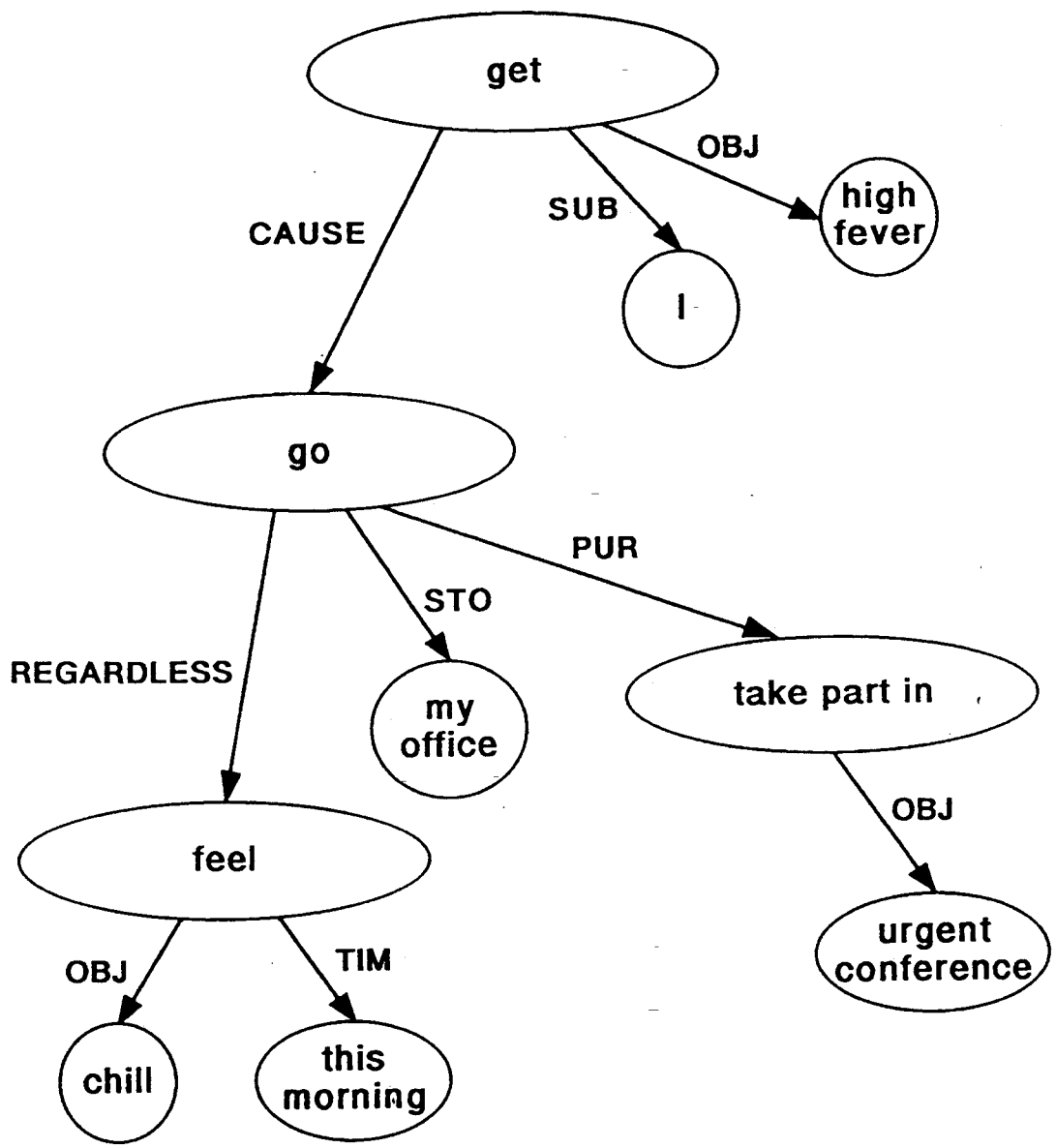
FIG. 15 is a diagram expressing an example of a semantic representation which is the subject of processing for generating English sentence.

FIG. 15 shows an example of the semantic representations inputted to the sentence generator 400 for Japanese-to-English translation. The semantic representations shown in FIG. 15 express the following: "I felt chill this morning but I went to my office to take part in an urgent conference so I got a high fever.".

The control procedure executed by the sentence generator 400 for this example of translation is the same as in FIG. 4. At step S1 in FIG. 4, the system waits for entry of semantic representations.

When the semantic representations are fed into the semantic representation storing unit 401, the program proceeds to the sentence generating processing of step S2. The sentence generating process is divided into n portions. At step S2, the sentence generating processing operations of the corresponding n-number of sentence generating units $402_1$–$402_n$ are executed in order. The sentence generating unit $402_m$ which executes step S2 processes the semantic representations using limitations applied beforehand to the unit 407 which stores the limitations for sentence generation, and the results of processing are stored in the result storing unit $403_m$.

The limitations for generating English sentences stipulate the direction of selection as English sentences are being generated, and they are given in the form of a table, as stated earlier. Examples of the limitations are shown in table 3.

The limitations for English sentences are of two types, namely fixed limitations, such as sentence style, which do not change while one sentence is in the process of being generated, and free limitations, such as the number of words in one English sentence, which can change during the process of sentence generation. Initial values of the free limitations given in advance and the current values are written in the table of the limitation storing unit 407, and historical information relating to these values is accumulated. This is the same as described earlier with regard to the table (Table 2) for generating Japanese sentences.

When step S2 ends, the generated results are evaluated at step S3. This evaluation is performed by comparing an evaluation value for the results currently obtained and an evaluation reference value given in advance. The reference value can be set in conformity with the level of the reader.

It is determined at step S4 whether all sentence generating processes have ended. If they have, the sentence constituting the current result is outputted and processing is ended.

If, on the other hand, the results of evaluation do not satisfy the evaluation criterion, sentence generation is performed again. In order to obtain better results when sentence generation is re-executed, the limitations are changed in accordance with the improvement rules of Table 4. Consequently, the program proceeds to step S5.

At step S5, sentence-improvement knowledge conforming to the results of evaluation are extracted from the sentence-improvement knowledge base 409 in order to ascertain what part of the outputted results is inappropriate and how this should be improved.

Figure 16:
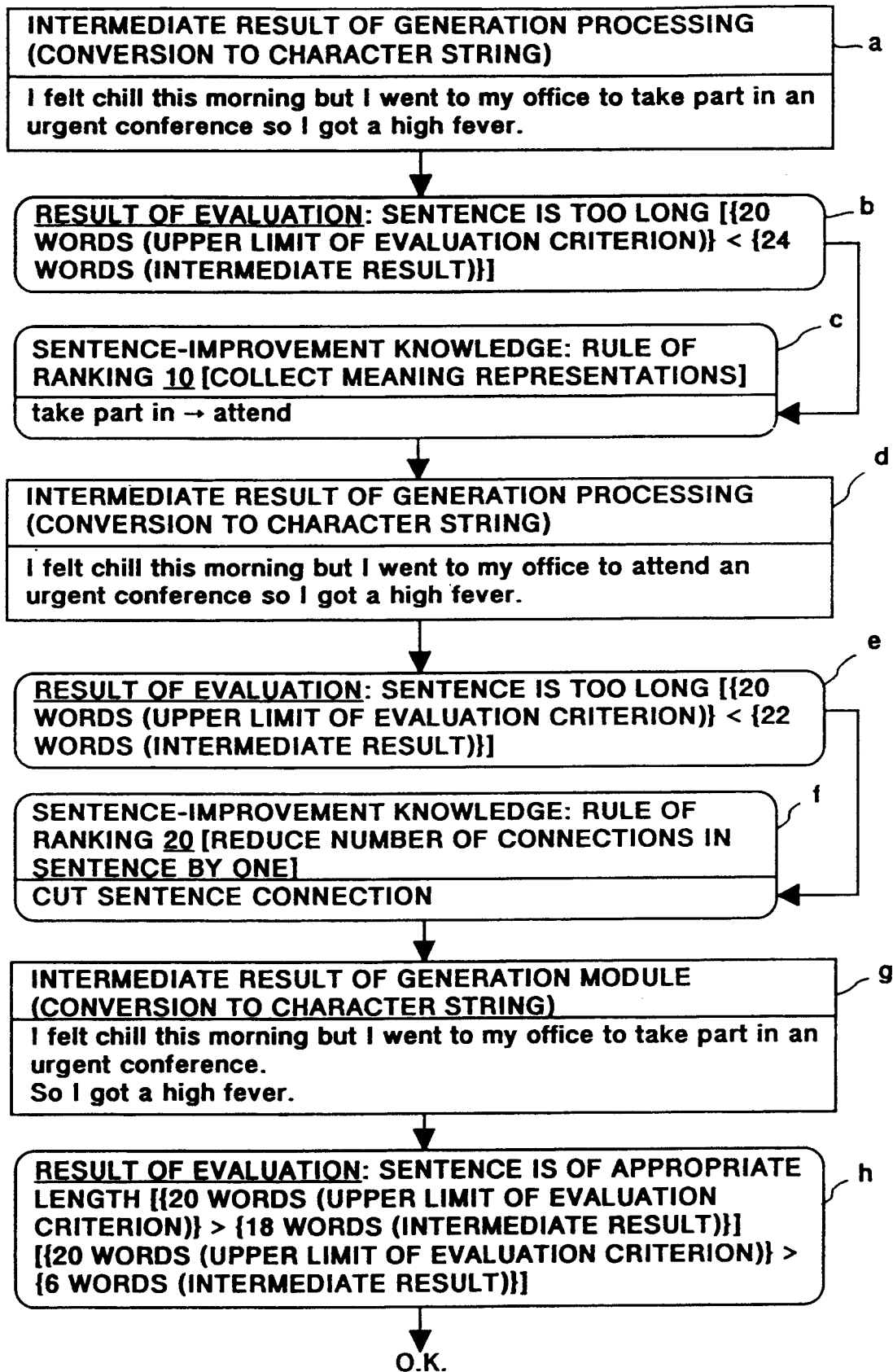
FIG. 16 is a diagram showing, in detail, the changes in the flow of processing for generating an English sentence.

FIG. 16 illustrates an evaluation as well as the transition of sentence re-generation according to this example.

First, it is determined that the initially generated result a, namely "I felt chill this morning but I went to my office to take part in an urgent conference so I got a high fever." has a length of 24 words in English. Since this length exceeds an upper limit of 20 words set as an evaluation criterion, an evaluation result b (FIG. 16) to the effect that the sentence is too long is obtained. The sentence-improvement knowledge for this evaluation is as shown in Table 4.

Rules which express how-a sentence should be improved are written in the sentence-improvement knowledge. For instance, as an example of an improvement rule for making the evaluation that a sentence is too long, one can be given which effects an improvement "Select sentence with fewer number of words." in "auxiliary-verb/mood decision" processing or "Reduce number of nestings." in "relative clause" processing Rankings are set in the knowledge for English-sentence improvement, just as in the case of Japanese-sentence improvement.

Based upon the sentence-improvement knowledge extracted at step S5, the limitations for sentence generation in the immediately preceding generation processing operation, which applies feedback, are changed at step S6.

In order to shorten sentence length in this example, feedback is applied to "predicate decision" processing and a sentence-improving rule turning on the limitation "arrange sentence semantic representations" of ranking "17" in Table 4 is used initially.

The generation processing to be fed back is designated at step S7 and the program then returns to the generation processing ("predicate decision" processing in this case) of step S2.

When the object, compliments and modifiers of the semantic representations shown in FIG. 15 are reconsidered, it will be understood that the passage "take part in" is reworded as "attend", as shown at c in FIG. 16. The sentence is generated again upon executing this rewording. The newly generated sentence d, namely "I felt chill this morning but I went to my office to attend an urgent conference so I got a high fever.", is re-evaluated by the evaluating unit 404. Now the number of words is 22. Though this represents an improvement, the length of the sentence still exceeds the upper limit of 20 words. As a result, the result of evaluation is that the sentence is still too long.

Based upon the evaluation result e, and in accordance with the sentence improving rules of Table 4, the semantic representations are divided according to the rule "reduce number of connections in the sentence by one" of ranking "20". When the limitation is thus changed, the program proceeds to step S2 again. It will be understood that the semantic representations shown in FIG. 15 are divided at "cause" (which connects "get" and "go"), which represents the connection relationship. Accordingly, by splitting up (f in FIG. 16) the semantic representations at step S2, the following sentence g is generated: "I felt chill this morning but I went to my office to take part in an urgent conference. So I got a high fever.".

The generated sentence is again delivered to the result storing unit 403 in order to be re-evaluated.

The two sentences resulting from the foregoing division are composed of 18 words and 6 words, respectively. Since the lengths of these sentences are appropriate, the evaluation criterion is satisfied and processing ends (h in FIG. 16).

Modification of English-Sentence Generation

In the example of English-sentence generation described above, a case in which the outputted translated sentence is in the English language is taken as an example. However, in a case where sentences in languages other than Japanese are outputted, the present invention can be applied as in the foregoing embodiment by preparing evaluation criteria, limitations and improvement knowledge corresponding to each language.

According to the embodiment described above, semantic representations of one sentence are extracted and processed. However, it is possible to perform sentence generation upon lumping together the semantic representations of a full body of text comprising a plurality of sentences and adopt the generated results as the subject of evaluation.

In the example of English-sentence generation described above, generation and evaluation are repeated in alternating fashion, just as in the first method of Japanese-sentence generation. Consequently, if the reference criterion is too stringent, obtaining an output sentence takes time. Accordingly, applying second through fourth methods similar to those used in Japanese-sentence generation to English-sentence generation would be very convenient. In this case, there is the risk that an endless loop will be formed not only by designating a loop limitation a number of times but also when sentences having the same state are generated. According, an arrangement can be adopted in which sentence generation is terminated forcibly.

Furthermore, by revising evaluation reference values depending upon the English reading level of the reader, English-language sentences suited to readers of a variety of levels can be created.

Four methods of generating Japanese sentences and one method of generating English sentences have been described. Though it is stated in the foregoing that sentence improvement is for the purpose of shortening sentence length, this does not impose a restriction upon the purpose of improvement. For example, as described in connection with the first method, a sentence improvement can be carried out in order to improve upon the types of expressions used. For instance, a sentence using highly respectful expressions can be converted into one using gentler expressions.

The present invention is not limited to the above embodiments and various changes and modifications can be made within the spirit and scope of the present invention. Therefore, to apprise the public of the scope of the present invention, the following claims are made.

What is claimed is:

1. A sentence generating system for generating a sentence from an inputted semantic representation, comprising:
   condition storing means for storing a condition which a generated sentence should satisfy;
   sentence generating means for generating a sentence from the inputted semantic representation based upon the condition stored in said condition storing means;
   evaluating means for evaluating the entire sentence generated by said sentence generating means;
   altering means for altering the condition, which has been stored in said condition storing means, based upon the result of an evaluation obtained by said evaluating means; and
   re-execution control means for performing control of the system in such a manner that generation of the sentence by said sentence generating means is re-executed based upon the altered condition.

2. The system according to claim 1, wherein said sentence generating means has a plurality of partial sentence generating means each of which executes part of the process of generating a sentence, and said evaluating means evaluates results generated by each of said plurality of partial sentence generating means.

3. The system according to claim 1, further comprising sentence storing means for storing the sentence generated by said sentence generating means, wherein said evaluating means evaluates the sentence stored in said sentence storing means and delivers the evaluation results of said evaluating means to said altering means.

4. The system according to claim 1, wherein said evaluating means evaluates the sentence based upon the length of the sentence.

5. The system according to claim 4, wherein said altering means has rules for shortening the length of the generated sentence, these rules describing values for shortening the sentence with regard to said condition.

6. The system according to claim 5, wherein said rules regulate word length of words contained in the generated sentence.

7. The system according to claim 5, wherein said rules regulate the number of clauses contained in the generated sentence.

8. The system according to claim 1, further comprising counting means for counting the number of times sentence generation is executed by said sentence generating means;
   wherein when sentence generation is re-executed based upon the condition altered by said altering means, said re-execution control means controls re-execution in dependence upon a count recorded by said counting means.

9. The system according to claim 8, wherein said sentence generating means has a plurality of partial sentence generating means each of which executes part of the process of generating a sentence, and said evaluating means evaluates results generated by each of said plurality of partial sentence generating means.

10. The system according to claim 8, wherein said re-execution control means limits the number of re-executions.

11. The system according to claim 8, wherein said re-execution control means alters a value of a criterion for evaluation executed by said evaluating means.

12. A sentence generating system for generating a sentence from an inputted semantic representation, comprising:

condition storing means for storing a condition which a generated sentence should satisfy;

sentence generating means for generating a sentence from the inputted semantic representation based upon a condition stored in said condition storing means;

evaluation-criterion storing means for storing a value of a criterion for evaluating the entire sentence generated by said sentence generating means;

criterion altering means for altering the value of a criterion stored in said evaluation-criterion storing means;

evaluating means for evaluating the entire sentence, which has been generated by said sentence generating means, in accordance with the value of a criterion stored in said evaluation-criterion storing means;

condition altering means for alternating the condition, which has been stored in said condition storing means, based upon the result of evaluation obtained by said evaluation means; and re-execution control means for performing control of the system in such a manner that generation of the sentence by said sentence generating means is re-executed based upon the condition altered by said condition altering means.

13. The system according to claim 12, wherein said criterion altering means has random-number generating means for generating a random number, the value of a criterion being altered based upon the random number generated by said random-number generating means.

14. The system according to claim 12, further comprising sentence storing means for storing the sentence generated by said sentence generating means, wherein said evaluating means evaluates the sentence stored in said sentence storing means in accordance with the value of a criterion stored in said evaluation-criterion storing means.

15. A machine translating system for translating an inputted sentence in a first language into a sentence in a second language and outputting the sentence in the second language, comprising:

input means for inputting the sentence in the first language;

analyzing means for outputting a semantic representation upon analyzing the sentence in the first language inputted by said input means;

condition storing means for storing a condition which a sentence generated in the second language should satisfy;

sentence generating means for generating the sentence in the second language from the semantic representation based upon the condition stored in said condition storing means;

output means for outputting the sentence generated in the second language by said sentence generating means;

evaluating means for evaluating the entire sentence generated by said sentence generating means; and re-execution control means having altering means for altering the condition, which has been stored in said condition storing means, based upon the result of an evaluation made by said evaluating means, said re-execution control means performing control of the system in such a manner that generation of the sentence in the second language by said sentence generating means is re-executed based upon the altered condition.

16. The system according to claim 15, wherein said sentence generating means has a plurality of partial sentence generating means each of which executes part of the process of generating a sentence, and said evaluating means evaluates results generated by each of said plurality of partial sentence generating means.

17. The system according to claim 15, further comprising sentence storing means for storing the sentence generated by said sentence generating means, wherein said evaluating means evaluates the sentence stored in said sentence storing means in accordance with the value of a criterion stored in said evaluating means.

18. The system according to claim 15, wherein said re-execution control means halts re-execution in a case where said evaluating means has determined that a predetermined criterion has been satisfied.

19. A sentence generating method of generating a sentence from an inputted semantic representation, comprising the steps of:

a. storing a condition which a generated sentence should satisfy;

b. generating a sentence from the inputted semantic representation based upon the condition that has been stored;

c. evaluating the sentence generated in step b;

d. altering the condition that has been stored based upon the evaluation result of step c; and e. repeating steps b through d until the evaluation of step c satisfies a predetermined criterion.

20. The method according to claim 19, further comprising the steps of:

f. counting the number of times sentence generation is executed in step b; and g. controlling re-execution in dependence upon the counting in step f, when sentence generation is re-executed based upon the condition altered in step d.

21. A machine translating method of translating an inputted sentence in a first language into a sentence in a second language and outputting the sentence in the second language, comprising the steps of:

a. inputting the sentence in the first language and outputting a semantic representation upon analyzing the inputted sentence in the first language;

b. generating the sentence in the second language from the semantic representation based upon conditions which are previously stored and which a sentence generated in the second language should satisfy;

c. outputting the sentence generated in the second language;

d. evaluating the sentence generated in step b;

e. altering the conditions based upon an evaluation made in step d; and f. performing re-execution of step b in such a manner that generation of the sentence in the second language in step b is re-executed based upon the condition altered in step e.

* * * * *

UNITED STATES PATENT AND TRADEMARK OFFICE
CERTIFICATE OF CORRECTION

PATENT NO. : 5,369,574  Page 1 of 2
DATED : November 29, 1994
INVENTOR(S) : KOICHI MASEGI, ET AL.

It is certified that error appears in the above-indentified patent and that said Letters Patent is hereby corrected as shown below:

ON THE COVER PAGE

ABSTRACT

Line 4, "satisfy generator, a" should read --satisfy, a generator for--.
Line 6, "evaluation" should read --evaluation of--.

COLUMN 3

Line 52, "generating" should read --generating an--.
Line 59, "had" should be deleted.

COLUMN 4

Line 42, "of a" should be deleted

COLUMN 9

Line 49, "nested"" should read --nested."--.

COLUMN 13

Line 46, "representations" should read --representations.--.
Line 50, " "cause " should read --"cause"--.

UNITED STATES PATENT AND TRADEMARK OFFICE
CERTIFICATE OF CORRECTION

PATENT NO. : 5,369,574      Page 2 of 2

DATED : November 29, 1994

INVENTOR(S) : KOICHI MASEGI, ET AL.

It is certified that error appears in the above-indentified patent and that said Letters Patent is hereby corrected as shown below:

COLUMN 16

Line 20, "no" should read --not--; and "not" should read --no--.

COLUMN 20

Line 3, "English) ," should read --English),--.
Line 12, "limit at ion" should read --limitation--.

COLUMN 21

Line 4, "According," should read --Accordingly,--.

COLUMN 24

Line 32, "processing" should read --processing.--.

COLUMN 25

Line 45, "According," should read --Accordingly,--.

Signed and Sealed this

Thirtieth Day of May, 1995

Attest:

BRUCE LEHMAN

*Attesting Officer*      *Commissioner of Patents and Trademarks*